United States Patent
Feng et al.

(10) Patent No.: US 12,096,467 B2
(45) Date of Patent: *Sep. 17, 2024

(54) RADIO RESOURCE SELECTION AND SENSING FOR V2X TRANSMISSIONS

(71) Applicant: Panasonic Intellectual Property Corporation of America, Torrance, CA (US)

(72) Inventors: Sujuan Feng, Frankfurt (DE); Joachim Loehr, Hessen (DE); Prateek Basu Mallick, Hessen (DE); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,667

(22) Filed: Nov. 17, 2022

(65) Prior Publication Data

US 2023/0083753 A1    Mar. 16, 2023

Related U.S. Application Data

(63) Continuation of application No. 17/094,210, filed on Nov. 10, 2020, now Pat. No. 11,540,291, which is a (Continued)

(51) Int. Cl.
*H04W 72/40*    (2023.01)
*H04W 4/44*    (2018.01)
(Continued)

(52) U.S. Cl.
CPC .......... *H04W 72/563* (2023.01); *H04W 4/44* (2018.02); *H04W 74/0816* (2013.01);
(Continued)

(58) Field of Classification Search
CPC ......... H04W 4/40; H04W 4/44; H04W 24/08; H04W 28/26; H04W 64/006;
(Continued)

(56) References Cited

U.S. PATENT DOCUMENTS 9,961,685 B2    5/2018  Sorrentino et al.
10,142,957 B2   11/2018 Sheng
(Continued)

FOREIGN PATENT DOCUMENTS

CN    105376809 A    3/2016
EP    3016465 A1     5/2016
(Continued)

OTHER PUBLICATIONS

3GPP TR 21.905 V13.0.0, "3rd Generation Partnership Project; Technical Specification Group Services and System Aspects; Vocabulary for 3GPP Specifications (Release 13)," Dec. 2015, 64 pages.
(Continued)

*Primary Examiner* — Frank Duong
(74) *Attorney, Agent, or Firm* — Seed IP Law Group LLP

(57) ABSTRACT

The invention relates to a transmitting device, which performs a resource sensing procedure to acquire information about radio resources usable for transmitting data at a later point in time. After data becomes available for transmission, the transmitting device performs an autonomous radio resource allocation to select radio resources within a transmission window to be used for transmitting the data, based on the information acquired by the resource sensing procedure during a sensing window. The autonomous radio resource allocation comprises selecting radio resources in primary subframes of the transmission window preferably over radio resources in secondary subframes of the transmission window. The secondary subframes correspond to those subframes in the sensing window during which the (Continued)

transmitting device did not perform the resource sensing procedure, and the primary subframes correspond to those subframes in the sensing window during which the transmitting device did perform the resource sensing procedure.

17 Claims, 14 Drawing Sheets

Related U.S. Application Data continuation of application No. 16/324,075, filed as application No. PCT/CN2016/094111 on Aug. 9, 2016, now Pat. No. 10,869,318.

(51) Int. Cl.
| | | |
|---|---|---|
| *H04W 72/563* | (2023.01) | |
| *H04W 74/0816* | (2024.01) | |
| *H04W 72/02* | (2009.01) | |
| *H04W 74/00* | (2009.01) | |
| *H04W 74/02* | (2009.01) | |

(52) U.S. Cl.
CPC .......... *H04W 72/02* (2013.01); *H04W 74/002* (2013.01); *H04W 74/02* (2013.01)

(58) Field of Classification Search
CPC ... H04W 72/02; H04W 72/04; H04W 72/048; H04W 72/06; H04W 72/08; H04W 72/10; H04W 72/563; H04W 74/002; H04W 74/02; H04W 74/0816; H04W 76/14; H04W 88/02
See application file for complete search history.

(56) References Cited

U.S. PATENT DOCUMENTS

| | | | |
|---|---|---|---|
| 10,244,538 B2 | 3/2019 | Sartori et al. | |
| 10,292,144 B2 | 5/2019 | Kim et al. | |
| 10,313,951 B2* | 6/2019 | Fujishiro | H04W 36/30 |
| 10,383,147 B2 | 8/2019 | Rajagopal et al. | |
| 10,536,949 B2 | 1/2020 | Sheng | |
| 10,798,738 B2 | 10/2020 | Tang et al. | |
| 11,005,607 B2* | 5/2021 | Basu Mallick | H04W 4/40 |
| 11,509,429 B2* | 11/2022 | Basu Mallick | H04L 1/1893 |
| 11,764,910 B2* | 9/2023 | Basu Mallick | H04L 1/08 370/329 |
| 2015/0326484 A1 | 11/2015 | Cao et al. | |
| 2015/0334760 A1* | 11/2015 | Sartori | H04L 12/6418 370/329 |
| 2017/0006580 A1 | 1/2017 | Patil et al. | |
| 2017/0150538 A1 | 5/2017 | Wei | |
| 2017/0332390 A1 | 11/2017 | Li et al. | |
| 2018/0020387 A1 | 1/2018 | Van Der Velde et al. | |
| 2018/0192397 A1 | 7/2018 | Seo | |
| 2019/0132832 A1 | 5/2019 | Uchiyama et al. | |
| 2020/0195389 A1 | 6/2020 | Basu Mallick et al. | |

FOREIGN PATENT DOCUMENTS

| | | |
|---|---|---|
| EP | 3051737 A1 | 8/2016 |
| EP | 3051737 B1 | 1/2020 |
| RU | 2 481 745 C2 | 5/2013 |
| WO | WO 2009086859 A1 | 7/2009 |
| WO | WO 2015021185 A1 | 2/2015 |
| WO | WO 2016117940 A1 | 7/2016 |
| WO | WO 2016120940 A1 | 8/2016 |

OTHER PUBLICATIONS

3GPP TR 23.713 V13.0.0, "3rd Generation Partnership Project; Technical Specification Group Services and System Aspects; Study on extended architecture support for proximity-based services (Release 13)," Sep. 2015, 80 pages.
3GPP TS 36.211 V13.1.0, "3rd Generation Partnership Project; Technical Specification Group Radio Access Network; Evolved Universal Terrestrial Radio Access (E-UTRA); Physical channels and modulation (Release 13)," Mar. 2016, 155 pages.
3GPP TS 36.212 V13.1.0, "3rd Generation Partnership Project; Technical Specification Group Radio Access Network; Evolved Universal Terrestrial Radio Access (E-UTRA); Multiplexing and channel coding (Release 13)," Mar. 2016, 129 pages.
3GPP TS 36.213 V13.1.1, "3rd Generation Partnership Project; Technical Specification Group Radio Access Network; Evolved Universal Terrestrial Radio Access (E-UTRA); Physical layer procedures (Release 13)," Mar. 2016, 361 pages.
3GPP TS 36.300 V13.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Mar. 2016, 295 pages.
3GPP TS 36.321 V13.2.0, "3rd Generation Partnership Project; Technical Specification Group Radio Access Network; Evolved Universal Terrestrial Radio Access (E-UTRA); Medium Access Control (MAC) protocol specification (Release 13)," Jun. 2016, 91 pages.
CATT, "Discussion on UE autonomous resource allocation in PC5-based V2V.," R1-162267, Agenda Item: 7.3.2.2.1, 3GPP TSG RAN WG1 Meeting #84bis, Busan, Korea, Apr. 11-15, 2016, 5 pages.
Chinese Office Action, issued May 28, 2021, for Chinese Application No. 201680089558.9, 12 pages. (with English Translation).
Ericsson, "Sensing and Autonomous Resource Selection," R1-165555, Agenda Item 6.2.2.2., 3GPP TSG RAN WG1 Meeting #85, Nanjing, P.R. China, May 23-27, 2016, 7 pages.
ETSI EN 302 571 V2.0.0, "Intelligent Transport Systems (ITS); Radiocommunications equipment operating in the 5 855 MHz to 5 925 MHz frequency band; Harmonised Standard covering the essential requirements of article 3.2 of Directive 2014/53/EU," Mar. 2016, 45 pages.
ETSI EN 302 637-2 V1.3.1, "Intelligent Transport Systems (ITS); Vehicular Communications; Basic Set of Applications; Part 2: Specification of Cooperative Awareness Basic Service," Sep. 2014, 44 pages.
ETSI EN 302 637-3 V1.2.1, "Intelligent Transport Systems (ITS); Vehicular Communications; Basic Set of Applications; Part 3: Specifications of Decentralized Environmental Notification Basic Service," Sep. 2014, 73 pages.
ETSI TS 102 687 V1.1.1, "Intelligent Transport Systems (ITS); Decentralized Congestion Control Mechanisms for Intelligent Transport Systems operating in the 5 GHz range; Access layer part," Jul. 2011, 45 pages.
ETSI TS 136 321 V12.5.0, "LTE; Evolved Universal Terrestrial Radio Access (E-UTRA); Medium Access Control (MAC) protocol specification (3GPP TS 36.321 version 12.5.0 Release 12)," Apr. 2015, 79 pages.
Extended European Search Report, dated May 31, 2019, for European Application No. 16911983.1-1215, 11 pages.
Guangdong OPPO Mobile Telecom, "Discussion on the mode-2 resource allocation for V2V," R1-164466, Agenda Item: 6.2.2.2.5, 3GPP TSG RAN WG1 Meeting #85, Nanjing, China, May 23-27, 2016, 6 pages.
Huawei, HiSilicon, "Collision avoidance for Mode 2," R1-156932, Agenda Item 6.2.8.1.1, 3GPP TSG RAN WG1 Meeting #83, Anaheim, USA, Nov. 15-22, 2015, 6 pages.
Huawei, HiSilicon, "Mode 2 resource allocation for D2D," R1-142839, Agenda Item: 7.2.3.2.1, 3GPP TSG RAN WG1 Meeting #78, Dresden, Germany, Aug. 18-22, 2014, 6 pages.
International Search Report, dated Mar. 29, 2017, for International Application No. PCT/CN2016/094111, 2 pages.
Japanese Office Action, dated Jan. 28, 2020, for Japanese Application No. 2019-505030, 12 pages. (with English translation).
NTT Docomo, Inc., "Transmitter UE behaviour for sensing-based resource allocation," R1-165192, Agenda Item 6.2.2.2.2, 3GPP TSG RAN WG1 Meeting #85, Nanjing, P.R. China, May 23-27, 2016, 7 pages.

(56) References Cited

OTHER PUBLICATIONS

RAN WG1, "LS on RAN1 agreements potentially related to RAN2 in sidelink-based V2V," R1-165965, 3GPP TSG RAN WG1 Meeting #85, Nanjing, China, May 23-27, 2016, 4 pages.
RAN WG1, "LS on RAN1 agreements potentially related to RAN2 in sidelink-based V2V," R2-164606, Rel-14, 3GPP TSG RAN WG2 Meeting #95, Gothenburg, Sweden, Aug. 22-26, 2016, 4 pages.
Russian Decision To Grant dated Aug. 12, 2020 for the corresponding Russian Patent Application No. 2020109722, 19 pages. (with English translation).
Russian Search Report dated Aug. 12, 2020 for the corresponding Russian Patent Application No. 2020109722, 4 pages. (with English translation).
Shih et al., "UE Autonomous Resource Selection for D2D Communications: Explicit vs. Implicit Approaches," IEEE Conference on Standards for Communications and Networking (CSCN), 2016, 6 pages.
Sony, "Discussion on sensing for autonomous resource selection," R1-162560, Agenda Item: 7.3.2.2.1, 3GPP TSG RAN WG1 Meeting #84bis, Busan, Korea, Apr. 11-15, 2016, 5 pages.

\* cited by examiner

RADIO RESOURCE SELECTION AND SENSING FOR V2X TRANSMISSIONS

BACKGROUND

Technical Field

The present disclosure relates to improved transmitting devices for performing a radio resource selection and sensing procedure. The present disclosure is providing the corresponding methods and devices for the disclosure.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block." A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)," current version 13.1.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair," or equivalent "RB pair" or "PRB pair."

The term "component carrier" refers to a combination of several resource blocks in the frequency domain. In future releases of LTE, the term "component carrier" is no longer used; instead, the terminology is changed to "cell," which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the η×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

MAC Layer/Entity, RRC Layer, Physical Layer

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by e.g., the 3GPP technical standard TS 36.321, current version 13.2.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see subclauses 5.4 and 5.3 of TS 36.321 incorporated herein by reference) for the RLC layer through logical channels, which are either control logical channels which carry control data (e.g., RRC signaling) or traffic logical channels which carry user plane data. On the other hand, the data from the MAC layer is exchanged with the physical layer through transport channels, which are classified as downlink or uplink. Data is multiplexed into transport channels depending on how it is transmitted over the air.

The Physical layer is responsible for the actual transmission of data and control information via the air interface, i.e., the Physical Layer carries all information from the MAC transport channels over the air interface on the transmission side. Some of the important functions performed by the Physical layer include coding and modulation, link adaptation (AMC), power control, cell search (for initial synchronization and handover purposes) and other measurements (inside the LTE system and between systems) for the RRC layer. The Physical layer performs transmissions based on transmission parameters, such as the modulation scheme, the coding rate (i.e., the modulation and coding scheme, MCS), the number of physical resource blocks etc. More information on the functioning of the physical layer can be found in the 3GPP technical standard 36.213 current version 13.1.1, incorporated herein by reference.

The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signaling Radio Bearer (SRBs) and of radio bearers carrying user data (Data Radio Bearers, DRBs).

The radio link control (RLC) sublayer comprises mainly ARQ functionality and supports data segmentation and concatenation, i.e., RLC layer performs framing of RLC SDUs to put them into the size indicated by the MAC layer. The latter two minimize the protocol overhead independently from the data rate. The RLC layer is connected to the MAC layer via logical channels. Each logical channel transports different types of traffic. The layer above RLC layer is typically the PDCP layer, but in some cases it is the RRC layer, i.e., RRC messages transmitted on the logical channels BCCH (Broadcast Control Channel), PCCH (Paging Control Channel) and CCCH (Common Control Channel) do not require security protection and thus go directly to the RLC layer, bypassing the PDCP layer.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNodeB assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNodeB), aided by insertion of a cyclic prefix in the transmitted signal.

The basic physical resource used for data transmission consists of a frequency resource of size BWgrant during one time interval, e.g., a subframe, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. Several PDCCHs can be transmitted in one subframe.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g., Resource Blocks, RBs) on which a user is allocated. Alternatively, this information is termed resource block assignment (RBA). Note, that the number of RBs on which a user is allocated can be dynamic;

Carrier indicator, which is used if a control channel transmitted on a first carrier assigns resources that concern a second carrier, i.e., resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding," section 5.3.3.1 (current version v13.1.0 available at http://www.3gpp.org and incorporated herein by reference). The 3GPP technical standard TS 36.212, current version 13.1.0, defines in subclause 5.4.3, incorporated herein by reference, control information for the sidelink interface.

Semi-Persistent Scheduling (SPS)

In the downlink and uplink, the scheduling eNodeB dynamically allocates resources to user equipments at each transmission time interval via the L1/L2 control channel(s) (PDCCH) where the user equipments are addressed via their specific C-RNTIs. As already mentioned before, the CRC of a PDCCH is masked with the addressed user equipment's C-RNTI (so-called dynamic PDCCH). Only a user equipment with a matching C-RNTI can decode the PDCCH content correctly, i.e., the CRC check is positive. This kind of PDCCH signaling is also referred to as dynamic (scheduling) grant. A user equipment monitors at each transmission time interval the L1/L2 control channel(s) for a dynamic grant in order to find a possible allocation (downlink and uplink) it is assigned to.

In addition, E-UTRAN can allocate uplink/downlink resources for initial HARQ transmissions persistently. When required, retransmissions are explicitly signaled via the L1/L2 control channel(s). Since retransmissions are dynamically scheduled, this kind of operation is referred to as semi-persistent scheduling (SPS), i.e., resources are allocated to the user equipment on a semi-persistent basis (semi-persistent resource allocation). The benefit is that PDCCH resources for initial HARQ transmissions are saved. Semi-persistent scheduling may be used in the PCell in Release 10, but not in an SCell.

One example for a service, which might be scheduled using semi-persistent scheduling, is Voice over IP (VoIP). Every 20 ms a VoIP packet is generated at the codec during a talk-spurt. Therefore, eNodeB could allocate uplink or respectively downlink resources persistently every 20 ms, which could be then used for the transmission of Voice over IP packets. In general, semi-persistent scheduling is beneficial for services with a predictable traffic behavior, i.e., constant bit rate, packet arrival time is periodic.

The user equipment also monitors the PDCCHs in a subframe where it has been allocated resources for an initial transmission persistently. A dynamic (scheduling) grant, i.e., PDCCH with a C-RNTI-masked CRC, can override a semi-persistent resource allocation. In case the user equipment finds its C-RNTI on the L1/L2 control channel(s) in the sub-frames where the user equipment has a semi-persistent resource assigned, this L1/L2 control channel allocation overrides the persistent resource allocation for that transmission time interval, and the user equipment does follow the dynamic grant. When a user equipment does not find a dynamic grant, it will transmit/receive according to the semi-persistent resource allocation.

The configuration of semi-persistent scheduling is done by RRC signaling. For example the periodicity, e.g., PS_PERIOD, of the persistent allocation is signaled within Radio resource Control (RRC) signaling. The activation of a persistent allocation and also the exact timing as well as the physical resources and transport format parameters are sent via PDCCH signaling. Once semi-persistent scheduling is activated, the user equipment follows the semi-persistent resource allocation according to the SPS activation PDCCH every PS_PERIOD. Essentially, the user equipment stores the SPS activation PDCCH content and follows the PDCCH with the signaled periodicity.

In order to distinguish a dynamic PDCCH from a PDCCH which activates semi-persistent scheduling (also referred to as SPS activation PDCCH), a separate identity is introduced. Basically, the CRC of an SPS activation PDCCH is masked with this additional identity which is in the following referred to as SPS C-RNTI. The size of the SPS C-RNTI is also 16 bits, same as the normal C-RNTI. Furthermore, the SPS C-RNTI is also user equipment-specific, i.e., each user equipment configured for semi-persistent scheduling is allocated a unique SPS C-RNTI.

In case a user equipment detects that a semi-persistent resource allocation is activated by a corresponding SPS activation PDCCH, the user equipment will store the PDCCH content (i.e., the semi-persistent resource assignment) and apply it every semi-persistent scheduling interval, i.e., periodicity signaled via RRC. As already mentioned, a dynamic allocation, i.e., signaled on dynamic PDCCH, is only a "one-time allocation." Retransmissions of an SPS allocation are also signaled using the SPS C-RNTI. In order to distinguish the SPS activation from an SPS re-transmission, the NDI (new data indicator) bit is used. An SPS activation is indicated by setting the NDI bit to 0. An SPS PDCCH with the NDI-bit set to 1 indicates a re-transmission for a semi-persistently scheduled initial transmission.

Similar to the activation of semi-persistent scheduling, the eNodeB also can deactivate semi-persistent scheduling, also called SPS resource release. There are several options how a semi-persistent scheduling de-allocation can be signaled. One option would be to use PDCCH signaling with some PDCCH fields set to some predefined values, i.e., SPS PDCCH indicating a zero size resource allocation. Another option would be to use MAC control signaling.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE allows the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the disclosure the terms "D2D," "ProSe" and "sidelink" are interchangeable.

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface.

In D2D communication, UEs transmit data signals to each other over a direct link using the cellular resources instead of through the base station (BS). D2D users communicate directly while remaining controlled under the BS, i.e., at least when being in coverage of an eNB. Therefore, D2D can improve system performance by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

ProSe Direct Communication Layer-2 Link

In brief, ProSe direct one-to-one communication is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g., self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v13.0.0 section 7.1.2 incorporated herein by reference:

Establishment of a secure layer-2 link over PC5.
IP address/prefix assignment.
Layer-2 link maintenance over PC5.
Layer-2 link release over PC5.

FIG. 3 illustrates how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.
2. UE-2 initiates the procedure for mutual authentication. The successful completion of the authentication procedure completes the establishment of the secure layer-2 link over PC5.

UEs engaging in isolated (non-relay) one-to-one communication may also use link-local addresses. The PC5 Signaling Protocol shall support keep-alive functionality that is used to detect when the UEs are not in ProSe Communication range, so that they can proceed with implicit layer-2 link release. The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related identities

3GPP TS 36.300, current version 13.3.0, defines in sub-clause 8.3 the following identities to use for ProSe Direct Communication:

SL-RNTI: Unique identification used for ProSe Direct Communication Scheduling;

Source Layer-2 ID: Identifies the sender of the data in sidelink ProSe Direct Communication. The Source Layer-2 ID is 24 bits long and is used together with ProSe Layer-2 Destination ID and LCID for identification of the RLC UM entity and PDCP entity in the receiver;

Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.

Second bit string is the MSB part (16 bits) of the Destination Layer-2 ID and is carried within the MAC header. This is used for filtering packets at the MAC layer.

No Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer. In case of one-to-one communications, higher layer provides Source Layer-2 ID and Destination Layer-2 ID.

Radio Resource Allocation for Proximity Services From the perspective of a transmitting UE, a Proximity-Services-enabled UE (ProSe-enabled UE) can operate in two modes for resource allocation:

- Mode 1 refers to the eNB-scheduled resource allocation mode, where the UE requests transmission resources from the eNB (or Release-10 relay node), and the eNodeB (or Release-10 relay node) in turn schedules the resources used by a UE to transmit direct data and direct control information (e.g., Scheduling Assignment). The UE needs to be RRC_CONNECTED in order to transmit data. In particular, the UE sends a scheduling request (D-SR or Random Access) to the eNB followed by a sidelink buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.
- On the other hand, Mode 2 refers to the UE-autonomous resource selection mode, where a UE on its own selects resources (time and frequency) from resource pool(s) to transmit direct data and direct control information (i.e., SA). At least one resource pool is defined e.g., by the content of SIB18, namely by the field commTxPoolNormalCommon, these particular resource pool(s) being broadcast in the cell and then commonly available for all UEs in the cell still in RRC_Idle state. Effectively, the eNB may define up to four different instances of said pool, respectively four resource pools for the transmission of SA messages and direct data. However, in Rel-12 a UE shall always use the first resource pool defined in the list, even if it was configured with multiple resource pools. This restriction was removed for Rel-13, i.e., a UE can transmit on multiple of the configured resource pools within one SC period. How the UE selects the resource pools for transmission is further outlined below (further specified in TS36.321).

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e., RRC_IDLE or RRC_CONNECTED, and the coverage state of the UE, i.e., in-coverage, out-of-coverage. A UE is considered in-coverage if it has a serving cell (i.e., the UE is RRC_CONNECTED or is camping on a cell in RRC_IDLE).

FIG. 4 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 4 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 4 can be used for LTE (overlay) transmissions and/or reception.

Transmission Procedure for D2D Communication

The D2D data transmission procedure according to Rel. 12/13 differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done e.g., with the exchange of the D2D communication Interest Indication by the UE and the corresponding response, D2D Communication Response, where the corresponding exemplary ProseCommConfig information element would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

- Step 1: UE sends SR (Scheduling Request) to eNB via PUCCH;
- Step 2: eNB grants UL resource (for UE to send sidelink BSR) via PDCCH, scrambled by C-RNTI;
- Step 3: UE sends D2D/sidelink BSR indicating the buffer status via PUSCH;
- Step 4: eNB grants D2D resource (for UE to send data) via PDCCH, scrambled by D2D-RNTI.
- Step 5: D2D Tx UE transmits SA/D2D data according to grant received in step 4.

A Scheduling Assignment (SA), also termed SCI (Sidelink Control Information) is a compact (low-payload) message containing control information, e.g., pointer(s) to time-frequency resources, modulation and coding scheme and Group Destination ID for the corresponding D2D data transmission. An SCI transports the sidelink scheduling information for one (ProSe) destination ID. The content of the SA (SCI) is basically in accordance with the grant received in Step 4 above. The D2D grant and SA content (i.e., SCI content) are defined in the 3GPP technical standard 36.212, current version 13.1.0, subclause 5.4.3, incorporated herein by reference, defining in particular the SCI format 0 (see content of SCI format 0 above).

On the other hand, for Mode 2 resource allocation, above steps 1-4 are basically not necessary, and the UE autonomously selects radio resources for the SA and D2D data transmission from the transmission resource pool(s) configured and provided by the eNB.

FIG. 5 exemplarily illustrates the transmission of the Scheduling Assignment and the D2D data for two UEs, UE-1 and UE-2, where the resources for sending the scheduling assignments are periodic, and the resources used for the D2D data transmission are indicated by the corresponding Scheduling Assignment.

FIG. 6 illustrates one specific example of the D2D communication timing for Mode 2, autonomous scheduling, during one SA/data period, also known as SC period, Sidelink Control period. FIG. 7 illustrates the D2D communication timing for Mode 1, eNB-scheduled allocation during one SA/data period. In Rel. 13, 3GPP defined an SC period as being the time period consisting of transmission of a Scheduling Assignment and its corresponding data. As can be seen from FIG. 6, the UE transmits after an SA-offset time, a Scheduling Assignment using the transmission pool resources for scheduling assignments for Mode 2, SA_Mode2_Tx_pool. The 1st transmission of the SA is followed e.g., by three retransmissions of the same SA message. Then, the UE starts the D2D data transmission, i.e., more in particular the T-RPT bitmap/pattern, at some configured offset (Mode2data_offset) after the first subframe of the SA resource pool (given by the SA_offset). One D2D data transmission of a MAC PDU (i.e., a transport block) consists of its 1st initial transmission and several retransmissions. For the illustration of FIG. 6 (and of FIG. 7) it is assumed that three retransmissions are performed (i.e., 2nd, 3rd, and 4th transmission of the same MAC PDU). The Mode2 T-RPT Bitmap (time resource pattern of transmission, T-RPT) basically defines the timing of the MAC PDU transmission (1st transmission) and its retransmissions ($2^{nd}$ $3^{rd}$, and $4^{th}$ transmission). The SA pattern basically defines the timing of the SA's initial transmission and its retransmissions ($2^{nd}$, $3^{rd}$, and $4^{th}$ transmission).

As currently specified in the standard, for one sidelink grant, e.g., either sent by the eNB or selected by the UE itself, the UE can transmit multiple transport blocks, MAC PDUs, (only one per subframe (TTI), i.e., one after the other), however to only one ProSe destination group. Also the retransmissions of one transport block must be finished before the first transmission of the next transport block starts, i.e., only one HARQ process is used per sidelink grant for the transmission of the multiple transport blocks. Furthermore, the UE can have and use several sidelink grants per SC period, but a different ProSe destination be selected for each of them. Thus, in one SC period the UE can transmit data to one ProSe destination only one time.

As apparent from FIG. 7, for the eNB-scheduled resource allocation mode (Mode 1), the D2D data transmission, i.e., more in particular the T-RPT pattern/bitmap, starts in the next UL subframe after the last SA transmission repetition in the SA resource pool. As explained already for FIG. 6, the Mode1 T-RPT Bitmap (time resource pattern of transmission, T-RPT) basically defines the timing of the MAC PDU transmission (1st transmission) and its retransmissions (2nd, 3rd, and 4th transmission).

The sidelink data transmission procedure can be found in the 3GPP standard document TS 36.321 v13.2.0, section 5.14, incorporated herein by reference. Therein, the Mode-2 autonomous resource selection is described in detail, differentiating between being configured with a single radio resource pool or multiple radio resource pools.

What is discussed above is the current status of the 3GPP standard for the D2D communication. However, it should be noted that there has been ongoing discussions on how to further improve and enhance the D2D communication which will likely result in that some changes are introduced to the D2D communication in future releases. The present disclosure as will be described later shall be also applicable to those later releases.

For example, for 3GPP Rel. 14 which is currently under development, 3GPP may decide to change the transmission timing so as to no longer be based on SC periods as discussed above, but differently (e.g., based on subframes same/similar to Uu interface transmissions). Correspondingly, the above detailed examples on how transmissions over the sidelink (PC5) interface can be performed are merely exemplary and may apply to Rel. 13, but possibly not for later releases of the corresponding 3GPP standards.

Furthermore, in future releases of the D2D framework, particularly in connection with vehicular communication, T-RPTs might not be used anymore.

ProSe Network Architecture and ProSe Entities

FIG. 8 illustrates a high-level exemplary architecture for a non-roaming case, including different ProSe applications in the respective UEs A and B, as well as a ProSe Application Server and ProSe function in the network. The example architecture of FIG. 8 is taken from TS 23.303 v.13.2.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling etc., related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality, such as:
  Exchange of ProSe control information between ProSe-enabled UE and the ProSe Function over PC3 reference point.
  Procedures for open ProSe Direct Discovery of other ProSe-enabled UEs over PC5 reference point.
  Procedures for one-to-many ProSe Direct Communication over PC5 reference point.
  Procedures to act as a ProSe UE-to-Network Relay. The Remote UE communicates with the ProSe UE-to-Network Relay over PC5 reference point. The ProSe UE-to Network Relay uses layer-3 packet forwarding.
  Exchange of control information between ProSe UEs over PC5 reference point, e.g., for UE-to-Network Relay detection and ProSe Direct Discovery.
  Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function.
  Configuration of parameters (e.g., including IP addresses, ProSe Layer-2 Group IDs, Group security material, radio resource parameters). These parameters can be pre-configured in the UE, or, if in coverage, provisioned by signaling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

Vehicular Communication—V2X Services

A new study item has been set up in the 3GPP in Rel. 14 to consider the usefulness of new LTE features to the automotive industry—including Proximity Service (ProSe) and LTE-based broadcast services. The ProSe functionality explained above is thus considered as offering a good foundation for the V2X services. Changes to the D2D framework are discussed with regard to how the transmission of vehicular communication can be enhanced. For instance, T-RPT patterns might not be used any more. Furthermore, instead of or in addition to using TDD as discussed before for the transmission of data and SA, frequency division multiplexing may be foreseen. Cooperative services in vehicular scenarios are becoming essential for the future connected vehicle within the ITS (Intelligent Transportation Systems) research field. They are supposed to decrease road fatalities, improve the capacity of roads, diminish the carbon footprint of road transport and enhance the user experience during travels.

V2X communication is the passing of information from a vehicle to any entity that may affect the vehicle, and vice versa. This information exchange can be used to improve safety, mobility and environmental applications to include driver assistance vehicle safety, speed adaptation and warning, emergency response, travel information, navigation, traffic operations, commercial fleet planning and payment transactions.

LTE support for V2X services contains 3 types of different use cases which are the following:

V2V: covering LTE-based communication between vehicles.

V2P: covering LTE-based communication between a vehicle and a device carried by an individual (e.g., handheld terminal carried by a pedestrian, cyclist, driver or passenger).

V2I: covering LTE-based communication between a vehicle and a road side unit.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

With regard to V2V communication, E-UTRAN allows such (vehicle) UEs that are in proximity of each other to exchange V2V-related information using E-UTRA(N) when permission, authorization and proximity criteria are fulfilled. The proximity criteria can be configured by the MNO (Mobile Network Operator). However, UEs supporting V2V Service can exchange such information when served by or not served by E-UTRAN which supports V2X Service.

The device (vehicle UE) supporting V2V applications transmits application layer information (e.g., about its location, dynamics, and attributes as part of the V2V Service). The V2V payload must be flexible in order to accommodate different information contents, and the information can be transmitted periodically according to a configuration provided by the MNO.

V2V is predominantly broadcast-based; V2V includes the exchange of V2V-related application information between distinct devices directly and/or, due to the limited direct communication range of V2V, the exchange of V2V-related application information between distinct devices via infrastructure supporting V2X Service, e.g., RSU, application server, etc.

With regard to V2I communication, the device supporting V2I applications sends application layer information to the Road Side Unit, which in turn can send application layer information to a group of devices or a device supporting V2I applications.

V2N (Vehicle to Network, eNB/CN) is also introduced where one party is a UE and the other party is a serving entity, both supporting V2N applications and communicating with each other via LTE network.

With regard to V2P communication, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P Service can exchange such information even when not served by E-UTRAN which supports V2X Service.

The UE supporting V2P applications transmits application layer information. Such information can be broadcast by a vehicle with UE supporting V2X Service (e.g., warning to pedestrian), and/or by a pedestrian with UE supporting V2X Service (e.g., warning to vehicle).

V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X Service, e.g., RSU, application server, etc.

For this new study item V2X, 3GPP has provided particular terms and definition in TR 21.905, current version 13.0.0, which can be reused for this application.

Road Side Unit (RSU): An entity supporting V2I Service that can transmit to, and receive from a UE using V2I application. An RSU can be implemented in an eNB or a stationary UE.

V2I Service: A type of V2X Service, where one party is a UE and the other party is an RSU both using V2I application.

V2N Service: A type of V2X Service, where one party is a UE and the other party is a serving entity, both using V2N applications and communicating with each other via LTE network entities.

V2P Service: A type of V2X Service, where both parties of the communication are UEs using V2P application.

V2V Service: A type of V2X Service, where both parties of the communication are UEs using V2V application.

V2X Service: A type of communication service that involves a transmitting or receiving UE using V2V application via 3GPP transport. Based on the other party involved in the communication, it can be further divided into V2V Service, V2I Service, V2P Service, and V2N Service.

Many ITS services have common communication requirements:

Periodic status exchange. ITS services typically need to know about the status of vehicle or roadside terminals. This implies the periodic exchange of data packets with information about location, speed, identifier, etc.

Asynchronous notifications. This kind of messages is used to inform about a specific service event. In contrast to the previous status messages, the reliable delivery of these messages to a single terminal or a group of them is usually a key requirement.

Examples of the usage of the first communication type can be found on traffic efficiency services such as remote vehicle monitoring, which gathers periodic status data from vehicles, or safety services such as cooperative collision avoidance, which requires kinematic information about surrounding vehicles to detect potential impacts. Asynchronous notifications are mainly found in safety services, such as slippery pavement or post-collision warning.

Different types of messages are and will be defined for the V2V communication. Two different types of messages have been already defined by ETSI for the Intelligent Transport Systems (ITS), see corresponding European Standards ETSI EN 302 637-2 v1.3.1 and ETSI EN 302 637-3 v 1.2.1:

Cooperative Awareness Messages (CAM), which are continuously triggered by vehicle dynamics to reflect the vehicle status.

Decentralized Environmental Notification Messages (DENM), which are triggered only when vehicle-related safety events occur.

As the V2V and ITS standardizations are rather at the beginning, it is to be expected that other messages might be defined in the future.

CAMs are continuously (periodically) broadcast by ITS-Stations (ITS-S) to exchange status information with other ITS-Ss, and thus have a larger impact on the traffic load than event-triggered (aperiodic) DENM messages. Essentially CAM messages are a kind of heartbeat messages periodically broadcasted by each vehicle to its neighbors to provide information of presence, position, temperature, and basic status. On the contrary, DENMs are event-triggered messages broadcasted to alert road users of a hazardous event. For this reason, traffic characteristics of CAM messages as defined by ETSI for ITS are considered more representative of V2V traffic.

Cooperative Awareness Messages (CAMs) are messages exchanged in the ITS network between ITS-Ss to create and maintain awareness of each other and to support cooperative performance of vehicles using the road network. Point to multipoint communication shall be used for transmitting CAMs, such that the CAMs are transmitted from the originating ITS-S to the receiving ITS-Ss located in the direct communication range of the originating ITS-S. CAM generation shall be triggered and managed by the Cooperative Awareness basic service, which defines the time interval between two consecutive CAM generations. At present, the upper and lower limits of the transmission interval are 100 ms (i.e., CAM generation rate of 10 Hz) and 1000 ms (i.e., CAM generation rate of 1 Hz). The underlying philosophy of ETSI ITS is to send CAMs when there is new information to share (e.g., new position, new acceleration or new heading values). Correspondingly, when the vehicles are moving slowly and on constant heading and speed, a high CAM generation rate brings no real benefit because the CAMs only display minimal differences. The transmission frequency of CAMs of one vehicle varies between 1 HZ to 10 Hz as a function of the vehicle dynamics (e.g., speed, acceleration, and heading). For instance, the slower the vehicle drives, the less number of CAMs are triggered and transmitted. Vehicle speed is the main impacting factor on CAM traffic generation.

In the above, the periodic Cooperative Awareness messages have been described. However, it should be noted that although some of the above information has already been standardized, other information, such as the periodicities and the message sizes, are not standardized yet and are based on assumptions. Furthermore, the standardization might change in the future and thus might also change aspects of how the CAMs are generated and transmitted.

In order for the vehicular UE to have radio resources on the sidelink to transmit the CAMs, Mode1 and/or Mode2 radio resource allocation are envisioned as explained above. For Mode 1 radio resource allocation, the eNB allocates resources for the SA message and data for each SA period. However, when there is a lot of traffic (e.g., high-frequency periodic traffic), the overhead on the Uu link from UE to the eNB could be big.

As apparent from the above, a lot of V2V traffic is periodical, such that the 3GPP has agreed that for sidelink V2V communication Mode 1 (i.e., eNB scheduled radio resource allocation), sidelink semi-persistent radio resource allocation will be supported by eNBs and UEs.

It was agreed to support a sensing mechanism together with semi-persistent transmissions for assisting the autonomous resource control/selection mechanism for the V2X sidelink. The UE would indicate within the PSCCH (SA/SCI) that it has data on a selected set of periodically occurring resources until a resource selection occurs. This resource reservation information (signaled within the SCI) can be used by other UEs which are intending to transmit a V2X message for the selection of a resource such that resources that are already reserved/booked by other UEs are not considered for radio resource selection. This resource reservation/booking procedure is particularly suitable for traffic for which packets arrive with a certain periodicity, e.g., CAM messages.

The indication of reserved radio resources in the scheduling information as mentioned above can be monitored ("sensed") by other (vehicular) devices. In general, the sensing procedure collects information on radio resources and thus allows predictions on future radio resources which can be used in the resource allocation procedure to identify a set of resource candidates for transmission. Very few things have been already agreed by 3GPP, but it may be assumed that the sensing process categorizes time frequency resources into:

'Unavailable' resources. These are the resources on which the UE is not allowed to transmit since those resources are already booked/reserved by other UEs, and 'candidate (or available) resources'. These are the resources on which the UE may/can perform a transmission.

Furthermore, 3GPP agreed to also perform energy measurement for the sensing procedure, although the agreement did not provide for any details about how and what energy measurements are to be performed. Energy-based sensing can thus be understood as a process where UE measures received signal strength on PSSCH radio resources and/or PSCCH radio resources. Energy-based sensing essentially may be helpful to identify near versus far interferers.

Furthermore, it was discussed whether the priority of the data (or corresponding radio resource reservation) is indicated in the scheduling assignment (SCI) such that it may be used in the resource allocation procedure, although it was not agreed how the priority is effectively used.

A further topic coming up during discussion was to use the congestion level of the channel (i.e., of the PC5 interface) for the resource allocation procedure, which could be similar to a Channel Busy Rate (CBR) already known from the ETSI standards (see e.g., ETSI EN 302 571 v 2.0.0 and 102 687 v1.1.1.). Again, no details were discussed in said respect, let alone agreements on how to exactly use such a congestion level.

Sensing should be implementable in a simple way in order not to increase the complexity of the UE too much. It should be also noted that there might be multiple ways/options on how to implement the sensing algorithm.

Although general agreements were reached as regards sensing and resource reservation for V2X transmissions over the PC5 interface, implementing these mechanisms into current systems might cause problems and inefficiencies.

BRIEF SUMMARY

Non-limiting and exemplary embodiments provide an improved UE-autonomous radio resource allocation procedure for data transmission via a sidelink interface. The independent claims provide non-limiting and exemplary embodiments. Advantageous embodiments are subject to the dependent claims.

According to a first aspect, a transmitting device is provided for determining radio resources for the transmission of data (e.g., vehicular periodic or non-periodic data) via a sidelink interface to other devices. It is assumed that a resource sensing procedure is continuously performed by the transmitting device so as to acquire information about future radio resources. According to one example, the radio resource sensing at least comprises monitoring scheduling assignments transmitted by other devices that announce and/or reserve radio resources at a later point(s) in time. The reserved radio resources can then be excluded from the radio resource selection. Sensing may also comprise measuring the received signal energy in the radio resources. In the future, other information might be collected as well during the sensing. However, it should be noted that the sensing procedure is not performed in subframes where the device performs a transmission, since reception and transmission operations cannot be performed by the device at the same time.

It is assumed that at a particular time, data becomes available for transmission and the device proceeds to perform a UE-autonomous resource allocation procedure so as to determine relevant transmission parameters, including the actual frequency time radio resources to be used for the data transmission. A transmission window can be defined, starting at the point where the data became available, within which the transmission (and possibly the retransmissions) should be finished, e.g., so as to comply with delay requirements of the data. On the other hand, a sensing window can be defined as a period of time before the data became available and during which the sensing operation obtained information about the radio resources in the transmission window. During the radio resource allocation procedure the vehicular UE autonomously determines transmission parameters and selects radio resources so as to perform the data transmission within the transmission window.

Based on the results of the sensing procedure, the radio resource selection distinguishes between primary subframes and secondary subframes in the transmission window, wherein the secondary subframes are those subframes in the transmission window for which the resource sensing procedure provided less information than possible because in at least one subframe in the sensing window that corresponds to the secondary subframe the vehicular UE performed a transmission and thus could not perform the resource sensing procedure. Conversely, primary subframes are those subframes in the transmission window for which the resource sensing procedure performed by the vehicular UE collected all possible information, since it performed the resource sensing procedure in all corresponding subframes of the sensing window. For instance, a not performed resource sensing procedure in subframe t of the sensing window will result in a lack of information in future subframes that are spaced away by the possible periodicities of data transmissions. Exemplarily assuming a periodicity of multiple of 100 ms, with a minimum of 100 ms and the maximum of 1000 ms, subframes t+100 ms, t+200 ms, t+300 ms, . . . , and t+1000 ms will be considered as secondary subframes, when being within a transmission window of the vehicular UE.

The vehicular UE shall select preferably radio resources from the primary subframes over radio resources from secondary subframes. In said respect, provided there are more than one possible radio resource candidate, the ranking of radio resource candidates should be separate between the primary subframes and secondary subframes, and the UE shall select the highest-ranking candidate to be used for the transmission of the data. Optionally, if the highest-ranking candidate could not be used (e.g., causing a collision to other UEs), a second-highest-ranking candidate can be used and so on. The ranking procedure as such can be performed in different manners. It is advantageous to use a time delay between the radio resource candidate and arrival time of data as well as the energy prediction obtained for the radio resource candidates during the sensing procedure for ranking the candidates. Radio resource candidates incurring a short time delay are preferred over those that incur longer delays. On the other hand, radio resource candidates with a low energy prediction are preferred over those for which the sensing procedure predicted a high transmission energy.

Although it is possible to use measurements throughout all subframes of the sensing window for the energy prediction, further variants improve the energy prediction for a particular radio resource candidate by taking into account only those subframes that are related to the subframe of the radio resource candidate, the relation being based on the possible periodicities of the data, i.e., −100 ms, −200 ms, −300 ms, . . . , −1000 ms, as already discussed above.

According to a further aspect, the radio resource selection and transmission performed by the vehicular UE for scheduling assignments is improved in a similar manner as done for the data transmissions. Correspondingly, radio resources reservations can be made for the transmission of scheduling assignments, and the vehicular UE performs a radio resource sensing procedure, the results of which can be used for the radio resource selection for scheduling assignment transmissions. The resource reservation for scheduling assignments can be implemented separately or commonly with the radio resource reservation for data. When being implemented in common with the data resource reservation, the vehicular UE either reserves radio resources for both data and scheduling assignments or for none of them. A corresponding indication can be provided in the scheduling assignment such that the receiving entities learn that a received scheduling assignment also reserves radio resources for one or more future transmissions of the scheduling assignment and/or the data.

The radio resource selection procedure performed for the scheduling assignment transmission can also distinguish between primary and secondary subframes as discussed above with regard to the data transmissions. The corresponding results of the sensing procedure are used in said respect so as to distinguish between subframes in a transmission window for which the resource sensing procedure did acquire all possible information (resulting in a primary subframe) or did not acquire all possible information (resulting in a secondary subframe). A not-sensed subframe t in the sensing window results in a secondary subframe at t+100 ms, t+200 ms, t+300 ms, . . . , t+1000 ms. Again, resources from primary subframes shall be selected preferably over resources in secondary subframes for performing the selection procedure for the transmission of a scheduling assignment. The ranking procedure of candidates within the primary subframes and within the secondary subframes is to be performed separately from one another. The actual ranking procedure of resource candidates for the scheduling assignment transmission can be performed in the same manner as already discussed above for the resource candidate ranking for data transmissions. For instance, radio resource candidates incurring a short time delay are preferred over those that incur longer delays. On the other hand, radio resource candidates with a low energy prediction are preferred over those for which the sensing procedure predicted high transmission energy.

Correspondingly, in one general first aspect, the techniques disclosed here feature a transmitting device for determining radio resources to be used for a data transmission from the transmitting device via a sidelink interface to one or more receiving devices. A receiver and processor of the transmitting device perform a resource sensing procedure so as to acquire information about radio resources usable for the transmitting device to transmit data at a later point in time. After data becomes available for transmission, the processor performs an autonomous radio resource allocation to select radio resources within a transmission window to be used for transmitting the data, based on the information acquired by the resource sensing procedure during a sensing window before the data became available for transmission. The autonomous radio resource allocation comprises selecting radio resources in primary subframes of the transmission window preferably over radio resources in secondary subframes of the transmission window. The secondary subframes in the transmission window correspond to those subframes in the sensing window during which the transmitting device did not perform the resource sensing procedure, and the primary subframes in the transmission window correspond to those subframes in the sensing window during which the transmitting device did perform the resource sensing procedure.

Correspondingly, in one general first aspect, the techniques disclosed here feature a method for a transmitting device for determining radio resources to be used for a data transmission from the transmitting device via a sidelink interface to one or more receiving devices. The method comprises performing by the transmitting device a resource sensing procedure so as to acquire information about radio resources usable for the transmitting device to transmit data at a later point in time. After data becomes available for transmission, the transmitting device performs an autonomous radio resource allocation to select radio resources within a transmission window to be used for transmitting the data, based on the information acquired by the resource sensing procedure during a sensing window before the data became available for transmission. The autonomous radio resource allocation comprises selecting radio resources in primary subframes of the transmission window preferably over radio resources in secondary subframes of the transmission window. The secondary subframes in the transmission window correspond to those subframes in the sensing window during which the transmitting device did not perform the resource sensing procedure, and the primary subframes in the transmission window correspond to those subframes in the sensing window during which the transmitting device did perform the resource sensing procedure.

Correspondingly, in one general first aspect, the techniques disclosed here feature a transmitting device for transmitting a scheduling assignment and data via a sidelink interface to one or more receiving devices. A receiver and processor of the transmitting device perform a resource sensing procedure to acquire information about radio resources usable by the transmitting device for transmitting scheduling assignments at a later point in time. After first data becomes available for transmission, the processor performs an autonomous radio resource allocation procedure to select radio resources within a transmission window for transmitting the first data and to select radio resources within the transmission window for transmitting a first scheduling assignment based on the information acquired by the resource sensing procedure during a sensing window before the first data became available for transmission. The first scheduling assignment comprises information on the selected radio resources in the transmission window for transmitting the first data. A transmitter of the transmitting device transmits the first scheduling assignment using the selected radio resources and transmits the first data using the selected radio resources. The first scheduling assignment further indicates reserved radio resources usable at a later point in time by the transmitting device to transmit a second scheduling assignment for second data.

Correspondingly, in one general first aspect, the techniques disclosed here feature a method for a transmitting device for transmitting a scheduling assignment and data via a sidelink interface to one or more receiving devices. The method comprises performing a resource sensing procedure to acquire information about radio resources usable by the transmitting device for transmitting scheduling assignments at a later point in time. After first data becomes available for transmission, the method comprises performing an autonomous radio resource allocation procedure to select radio resources within a transmission window for transmitting the first data and selecting radio resources within the transmission window for transmitting a first scheduling assignment based on the information acquired by the resource sensing procedure during a sensing window before the first data became available for transmission. The first scheduling assignment comprises information on the selected radio resources in the transmission window for transmitting the first data. The method then comprises transmitting the first scheduling assignment using the selected radio resources and transmits the first data using the selected radio resources. The first scheduling assignment further indicates reserved radio resources usable at a later point in time by the transmitting device to transmit a second scheduling assignment for second data.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

FIG. 14 is a sequence diagram of the preemption procedure, illustrated in

FIG. 13,

DETAILED DESCRIPTION

Figure 1:
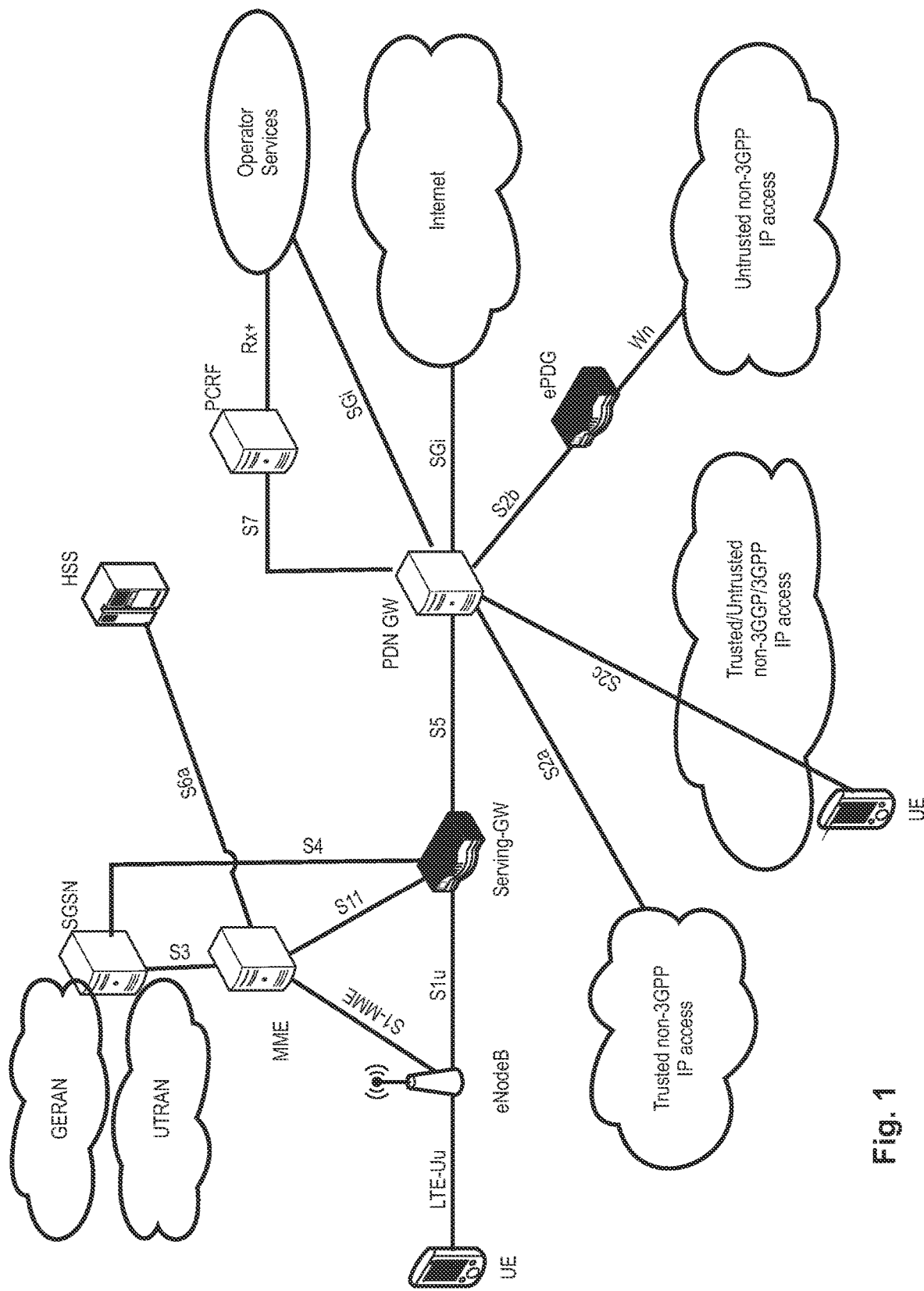
FIG. 1 shows an exemplary architecture of a 3GPP LTE system.
Figure 2:
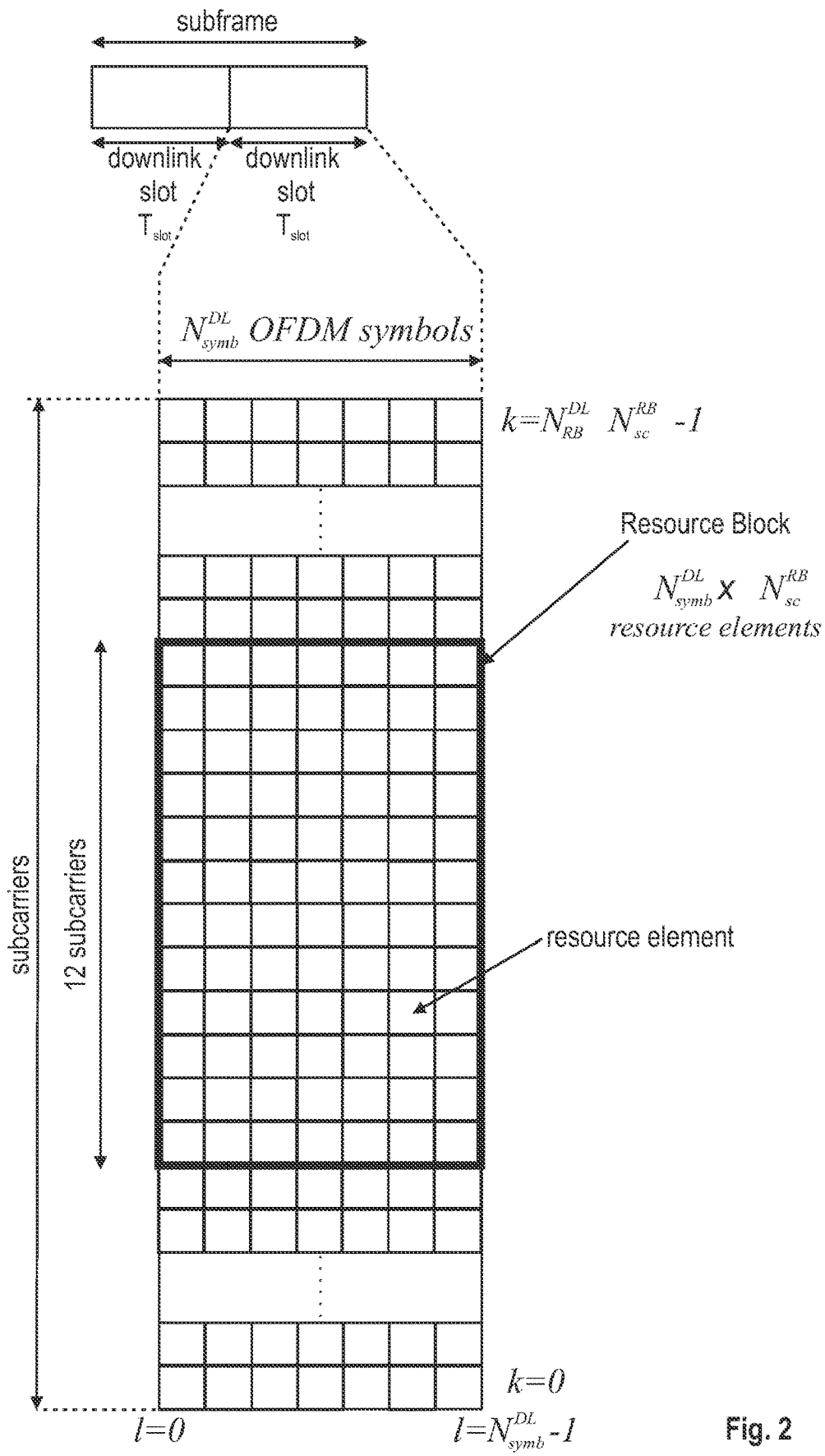
FIG. 2 shows an exemplary downlink resource grid of a downlink slot of a subframe as defined for 3GPP LTE (Release 8/9), FIG. 3 schematically illustrates how to establish a layer-2 link over the PC5 for ProSe communication.
Figure 3:
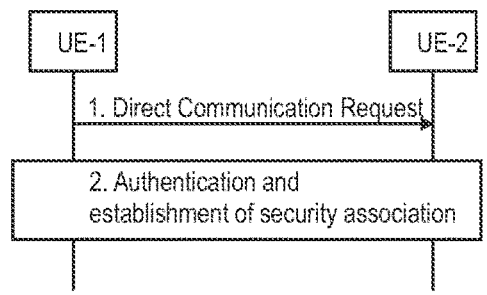
Figure 4:
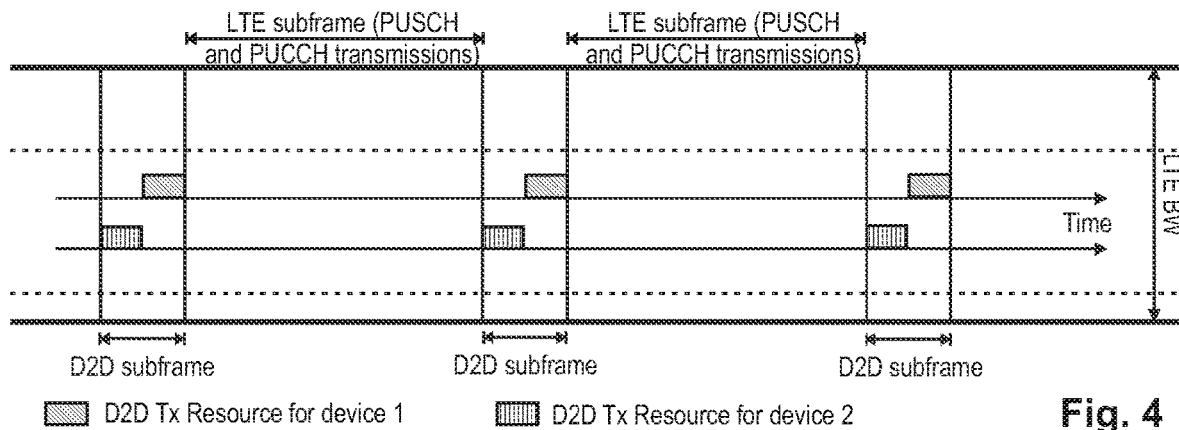
FIG. 4 illustrates the use of transmission/reception resources for overlay (LTE) and underlay (D2D) systems.
Figure 5:
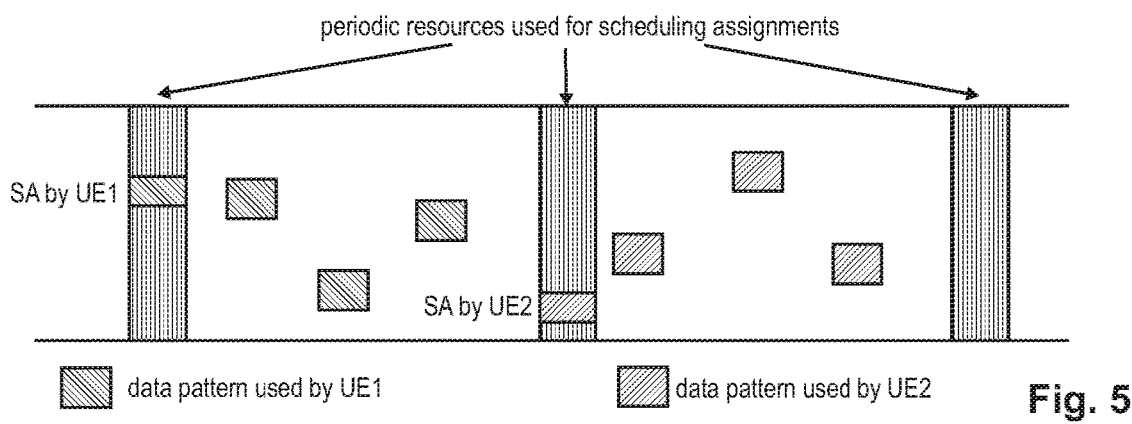
FIG. 5 illustrates the transmission of the Scheduling Assignment and the D2D data for two UEs.
Figure 6:
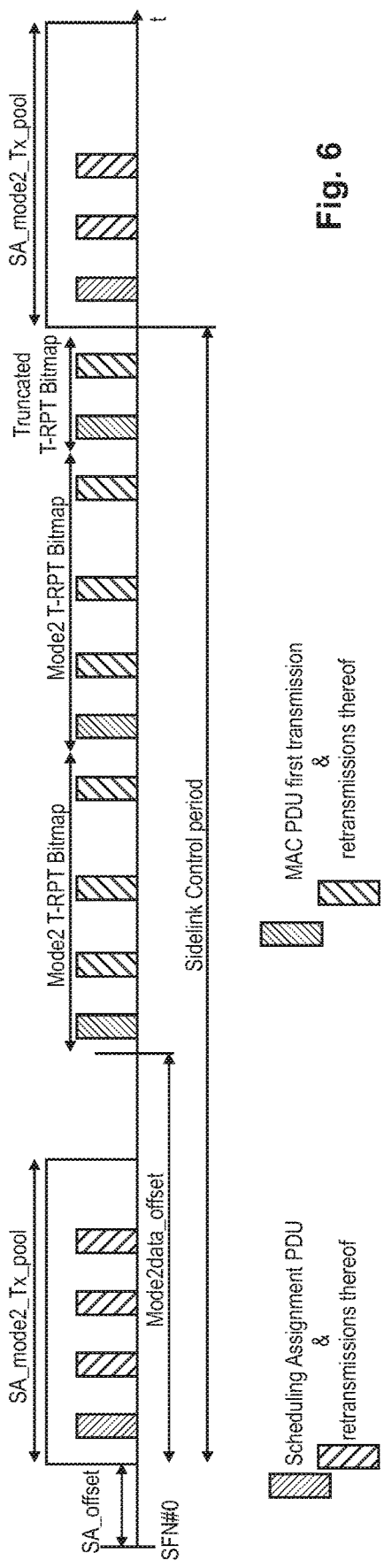
FIG. 6 illustrates the D2D communication timing for the UE-autonomous scheduling Mode 2.
Figure 7:
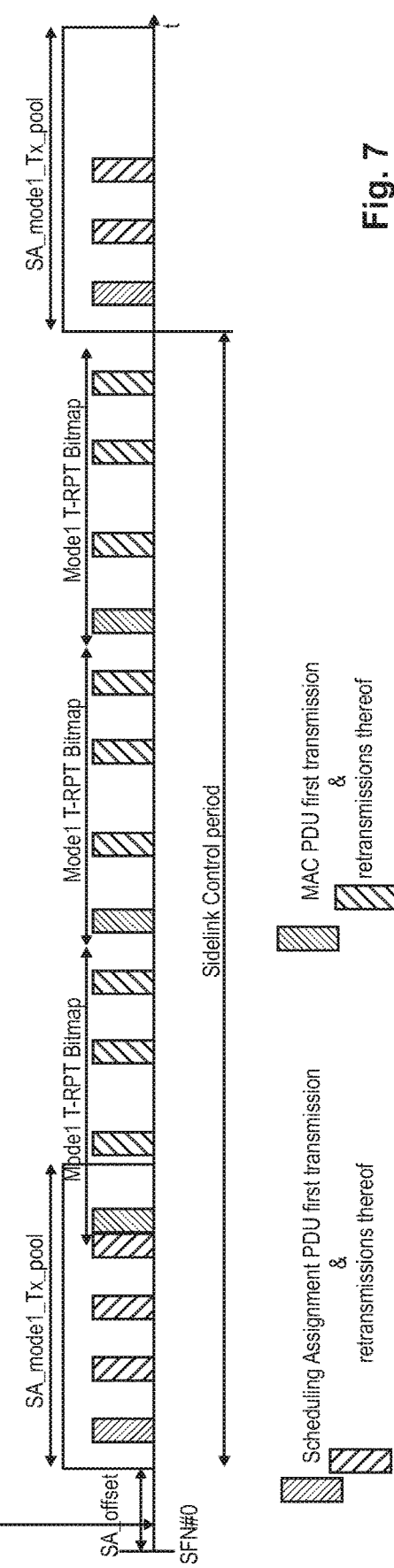
FIG. 7 illustrates the D2D communication timing for the eNB-scheduled scheduling Mode 1.
Figure 8:
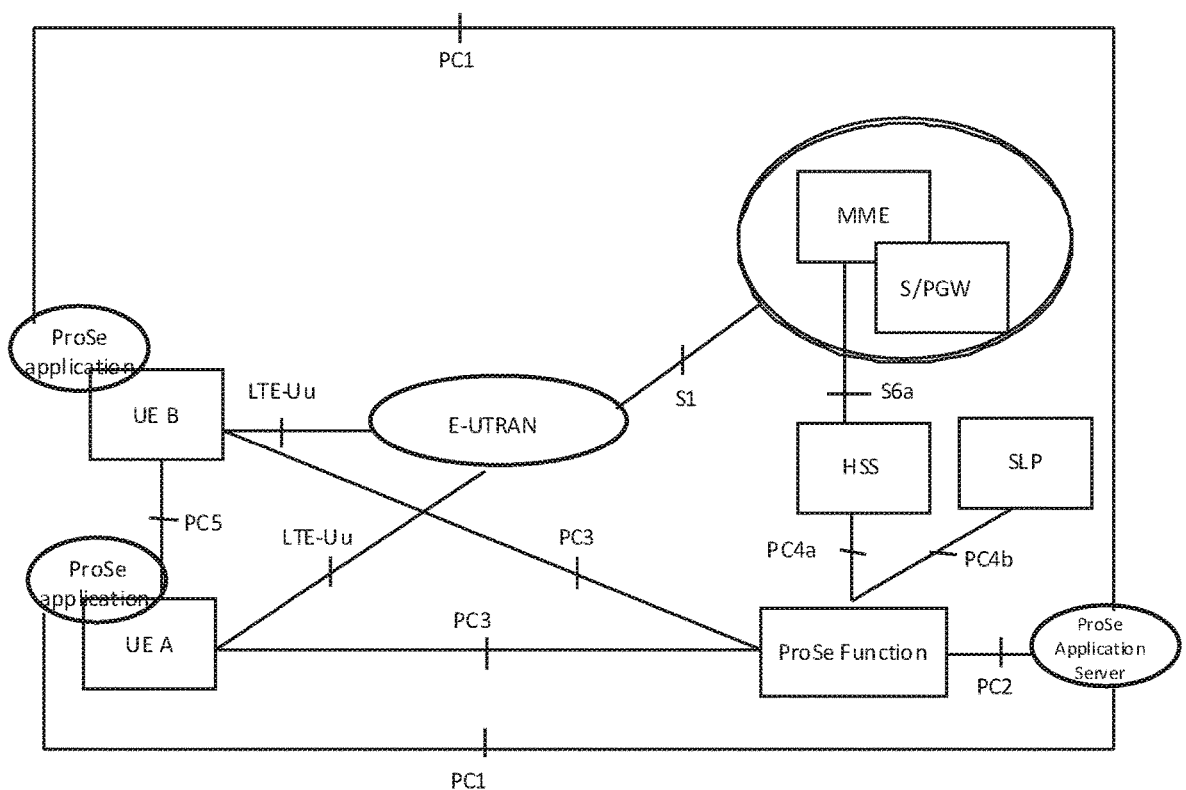
FIG. 8 illustrates an exemplary architecture model for ProSe for a non-roaming scenario.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "direct communication transmission" as used in the application is to be broadly understood as a transmission directly between two user equipments, i.e., not via the radio base station (e.g., eNB). Correspondingly, the direct communication transmission is performed over a "direct sidelink connection," which is the term used for a connection established directly between two user equipments. For example, in 3GPP the terminology of D2D (Device-to-Device) communication is used or ProSe communication, or a sidelink communication. The term "direct sidelink connection," "sidelink interface" is to be broadly understood and can be understood in the 3GPP context as the PC5 interface described in the background section.

The term "ProSe" or in its unabbreviated form, "Proximity Services," used in the application is applied in the context of Proximity-based applications and services in the LTE system as exemplarily explained in the background section. Other terminology such as "D2D" is also used in this context to refer to the Device-to-Device communication for the Proximity Services.

The term "vehicular mobile terminal" as used throughout the application is to be understood in the context of the new 3GPP study item respectively work item V2X (vehicular communication) as explained in the background section. Correspondingly, a vehicular mobile terminal shall be broadly understood as a mobile terminal which is specifically installed in a vehicle (e.g., car, commercial trucks, motorcycles etc) to perform vehicular communication, i.e., passing information related to the vehicle to other entities (such as vehicles, infrastructure, pedestrians) e.g., for the purpose of safety or driver assistance. Optionally, the vehicular mobile terminal may have access to information available at the navigation system (provided it is also installed in the car), such as map information etc.

The terms "autonomous radio resource allocation" (conversely "radio base station controlled radio resource allocation") as used throughout the application may exemplarily be understood in the context of 3GPP Proximity Services allowing two modes for the resource allocation; namely Mode 1 (i.e., the radio base station controlled radio resource allocation) according to which the radio base station controls the allocation, and Mode 2 (i.e., autonomous radio resource allocation) according to which the terminal (or transmitting device) autonomously selects the resources (without the radio base station).

As explained in the background section, 3GPP has introduced a new study item for LTE-assisted vehicular communication, which shall be based on ProSe procedures to exchange V2X traffic between the various vehicular mobile terminals and other stations. Furthermore, a kind of semi-persistent radio resource allocation shall be supported for V2X traffic and it has been agreed that mechanisms for radio resource reservation as well as sensing will be supported for said end—in particular for the UE-autonomous resource allocation mode (also referred to as Mode 2). However, only general agreements have been reached with respect to sensing and radio resource reservation without providing details on how to implement same and how to adapt other mechanisms so as to ensure efficient and flawless operation.

For instance, it remains unclear how exactly the resource sensing mechanism shall be implemented. More specifically, it is not clear how the energy measurement is calculated and how resources should be chosen based on the sensing mechanism during the Mode 2 radio resource allocation.

Figure 9:
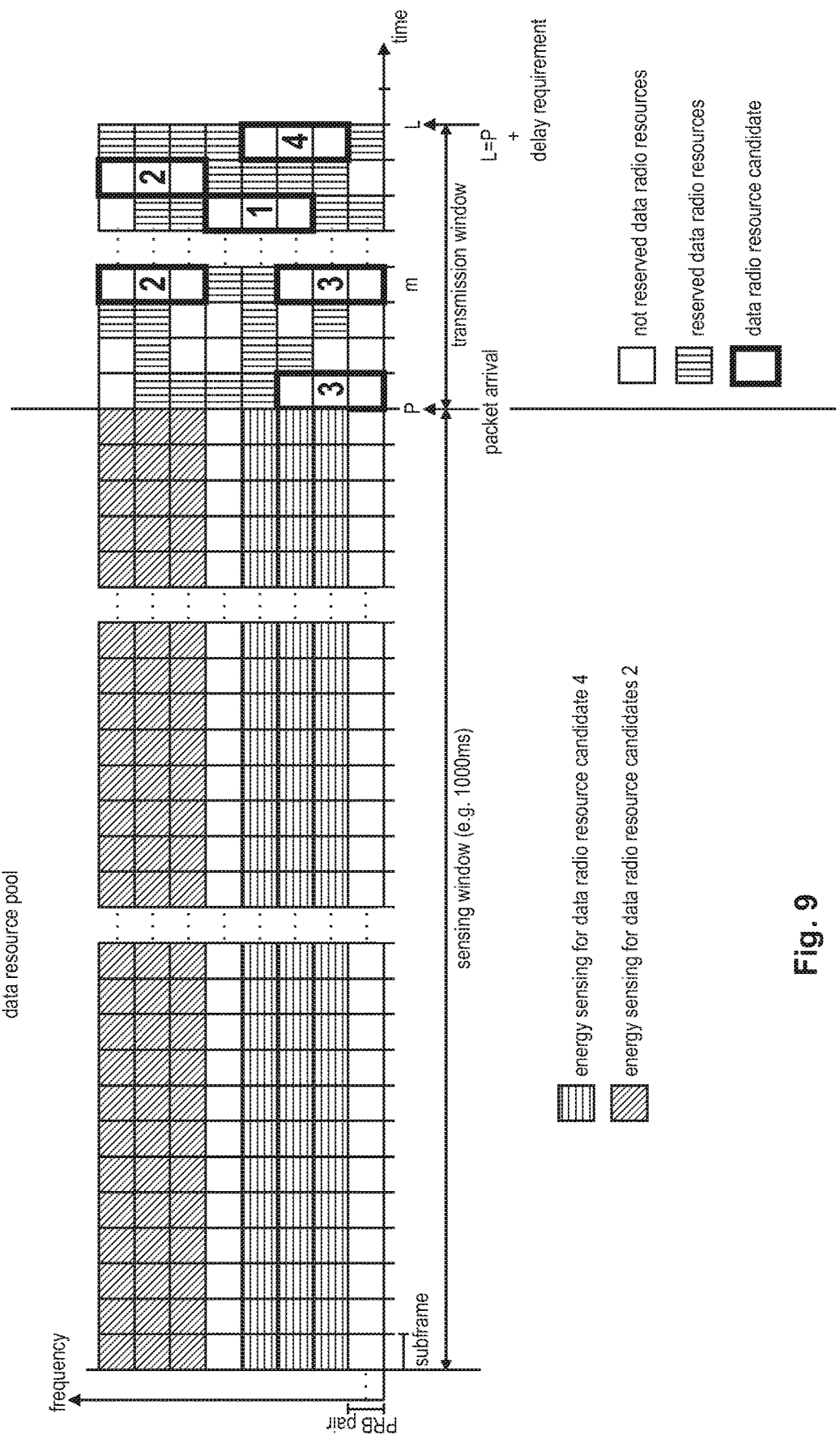
FIG. 9 illustrates frequency-time radio resources of a data resource pool for a vehicular UE divided at a time P where data becomes available for transmittal, into a transmission window and a sensing window.

One possible solution will be explained in the following with reference to FIG. 9, which illustrates frequency-time radio resources of a data resource pool of a vehicular UE (transmitting device in general). A PRB pair (Physical Resource Block pair; 12 subcarriers for one subframe) is taken as unit for exemplarily illustrating the frequency-time radio resources in the figure. FIG. 9 is an exemplary and simplified illustration for explaining the solution. It is assumed that at a time P data becomes available for transmission (i.e., a packet arrival), and the transmission of the data (possibly, as well the retransmissions) should be finished at time L, which is denoted as the transmission window and is dependent on the delay requirement(s) of the data that is to be transmitted (e.g., 100 ms; L=P+100 ms). The results of the sensing procedure obtained within a sensing window of e.g., 1000 ms before the packet arrival shall be considered for the radio resource allocation procedure to be performed by the vehicular UE to select the frequency time radio resources (and possibly other transmission parameters) for transmitting the data. It is exemplarily assumed that three (physical) resource block pairs are needed for the transmission of the data (according to the current standardization, the resource blocks should be contiguous).

One information obtained from the sensing procedure is that particular radio resources in the transmission window are already reserved by other devices and should thus not be used by the vehicular UE; the corresponding boxes are striped vertically. The remaining radio resource candidates (three contiguous resource block pairs) in the complete transmission window that are available for the vehicular UE to transmit the data are illustrated as framed in FIG. 9. There are six candidates in total in the transmission window, all of which may be e.g., ranked based on the energy measurements performed during the sensing procedure in the sensing window.

In more detail, it is possible to measure the energy (e.g., received signal strength) across the whole sensing window for related radio resource candidates. It is exemplarily assumed that the corresponding radio resource candidates are ranked from 1 to 4 as illustrated in FIG. 9 based on the energy measurements. Correspondingly, radio resource candidates 2, having the same corresponding frequency radio resources in the sensing window are ranked equally. The same applies to the two resource candidates 3 at the bottom part of the figure. FIG. 9 illustrates in diagonal stripes the corresponding radio resources of the sensing window, which measured energy is averaged to predict the energy for radio resource candidates 2. Similarly, FIG. 9 indicates the corresponding frequency time radio resources in the sensing window used for the energy measurement for resource candidate 4 are striped horizontally. Although not illustrated in FIG. 9 for ease of illustration, corresponding energy measurements and processing are performed for radio resources in the sensing window corresponding to candidates 1 and 3 as well. Correspondingly, the vehicular UE may then choose the highest-ranking radio resource candidate (in this example candidate 1) for being used for transmitting the data, e.g., the candidate with the lowest energy prediction.

The above provides a possible solution to implement the sensing procedure and the corresponding radio resource allocation.

An optional implementation thereof deals with the situation where no radio resource candidates are available (e.g., in case too many radio resources are reserved by other devices). The vehicular UE may thus have to select a radio resource candidate that collides with radio resources that are already reserved by other devices; this procedure may be denoted "preemption." During the preemption procedure the vehicular UE may select suitable radio resources from among the reserved radio resources in the transmission window randomly or may select suitable reserved radio resources with a relatively low received signal strength prediction. Alternatively, provided a priority is also indicated for the reserved radio resources, the vehicular UE may select the reserved radio resources having the lowest priority.

Several problems are however involved in connection with the above presented solution. For instance, the received signal strength prediction (transmission energy) for a particular radio resource candidate is based on the received signal strength measurements made in the corresponding frequency radio resources over the whole sensing window, and as such does not reflect the real transmission situation in the one subframe in which the resource candidate is located. Averaging the energy measurements over the whole sensing window for radio resource candidate(s) in one particular subframe does not take into account that data and scheduling assignment transmissions usually occur periodically, i.e., in only specific subframes. Moreover, the radio resource selection as exemplified above in connection with FIG. 9 results in a transmission opportunity which is quite late, i.e., at the end of the transmission window, such that the vehicular UE as well as the receiving entities have to wait a long time for the data; the latency of the data increases. When using the priority during the preemption procedure as discussed above, it is possible that the preempted UE (i.e., the UE which resources collide with the selected radio resource candidate) is located closely to the vehicular UE, such that severe interference occurs between the two "colliding" transmissions.

As explained in the background section, the D2D transmissions via the sidelink interface do not use full duplex but half duplex such that no simultaneous V2X transmission and reception is possible. Consequently, in those subframes where the vehicular UE makes a transmission (e.g., a scheduling assignment and/or data), no sensing procedure can be performed by the vehicular UE. It is unclear how these missed sensing opportunities affect the radio resource allocation procedure performed by the vehicular UE.

The following exemplary embodiments are conceived by the inventors to mitigate the problem(s) explained above.

Particular implementations of the various embodiments are to be implemented in the wide specification as given by the 3GPP standards and explained partly in the background section, with the particular key features being added as explained in the following embodiments. It should be noted that the embodiments may be advantageously used for example in a mobile communication system, such as 3GPP LTE-A (Release 10/11/12/13/14, or later releases) communication systems as described in the Technical Background section above, but the embodiments are not limited to its use in these particular exemplary communication networks.

The explanations should not be understood as limiting the scope of the disclosure, but as mere examples of embodiments to better understand the present disclosure. A skilled person should be aware that the general principles of the present disclosure as laid out in the claims can be applied to different scenarios and in ways that are not explicitly described herein. Several assumptions are made for illustration purposes which however shall not restrict the scope of the following embodiments.

The various embodiments mainly provide a radio resource allocation procedure performed by a vehicular UE when transmitting data to one or more receiving devices. Other functionality (i.e., functionality not changed by the various embodiments) may remain exactly the same as explained in the background section or may be changed without any consequences to the various embodiments. This may include for instance other procedures such as how the subsequent transmission of the data is exactly performed by the vehicular UE, or how the various transmitting devices discover each other.

One exemplary scenario to which the various embodiments can be applied is V2X-communication as exemplified in the background section. Consequently, the transmitting and receiving devices can be e.g., a UE in a vehicle, a road side unit, a "normal" mobile terminal carried by a pedestrian etc. Further, the data may be (periodic) vehicular data e.g., CAM messages, which shall be continuously exchanged among the various vehicular entities and for which the resource sensing procedure and semi-persistent resources have been discussed in 3GPP.

Although the following exemplary embodiments will be explained for illustration purposes in connection with such a V2X-communication scenario, the disclosure shall not be restricted thereto.

First Embodiment

In the following a first embodiment for solving the above-mentioned problem(s) will be described in detail. Different implementations and variants of the first embodiment will be explained as well.

As already mentioned above, exemplarily, a vehicular UE is assumed which is installed in a vehicle and is capable of performing vehicular communication based on the D2D framework as explained in the background section of this application. Correspondingly, vehicular data (e.g., periodic and aperiodic data) shall be transmitted by the vehicular UE to other entities for which the data is of interest.

It is assumed that the UE supports and mainly performs Mode-2 radio resource allocation and has been properly configured with the necessary resource pool(s) to be able to autonomously select radio resources for transmitting the scheduling information as well as the data via the PC5 (sidelink) interface.

The periodic data to be transmitted by the vehicular UE will be exemplified by the Cooperative Awareness Messages (CAMs) explained in detail in the background section. As explained in the background section, sensing and radio resource reservation have been generally approved by 3GPP to be included in future standard release(s) in connection with the transmission of periodic data. In particular, radio resource reservation at the transmitting side allows implementing a kind of "semi-persistent" radio resource allocation, by e.g., reserving the same resources as currently used also for one or more later time instances to transmit further packets of the periodic data. Consequently, it is not necessary at those later time instances for the vehicular UE to again perform a resource selection/request (Mode-1 or Mode-2 resource allocation) in order to be able to transmit the periodic data. The radio resource reservation can be implemented in different ways and has not been fixed yet by 3GPP. For instance, the radio resource reservation can be done for the next transmission instance or for a longer time period (i.e., for more than just the next transmission instance of the periodic data). The scheduling information (SCI) transmitted together with sidelink data identifies the radio resources that are used for the transmission and thus allows a receiving entity to properly receive and process/decode the sidelink data. The scheduling information may additionally be used to indicate the radio resource reservation, e.g., by indicating a time or periodicity of the data such that the receiving entity can determine for which time (e.g., subframe) the radio resources are reserved.

The vehicular UE shall further continuously perform the radio sensing procedure as explained in the background section so as to acquire information about future radio resources. This information can then be used during a Mode-2 radio resource allocation procedure performed by the vehicular UE to select radio resources (and possibly other transmission parameters) for transmitting the data (as well as the corresponding scheduling assignment). The sensing procedure includes decoding the scheduling assignments transmitted by other devices so as to identify reserved radio resources. Optionally, the sensing procedure further comprises energy measurements (e.g., the received signal strength, RSSI) throughout the frequency resources for data transmissions configured for the vehicular UE.

One potential implementation option of the resource sensing procedure is that every UE has a map with a prediction of frequency resources that spans over e.g., 100 ms (with e.g., a maximum of 1 second), starting from the next subframe. Then, at a time P when a packet arrives at the buffer in the UE, the UE already has prepared a map of all frequency resources for subframes P to L (may be termed a transmission window), where L basically corresponds to the maximum time span (according to QoS) until the packet should be transmitted. The frequency map may distinguish between unavailable and available radio resources (and possibly also comprises information as to the predicted energy level of the different radio resources). Other implementations of the radio sensing procedure are equally possible, e.g., where the UE does not continuously update such a future resource map, but rather predicts the radio resources from past measurements in the sensing window only when needed.

In summary, it is assumed that the vehicular UE continuously performs a radio resource sensing procedure to acquire information about future radio resources (be it reservations and/or RSSI predictions, or other information too). The vehicular UE shall be further able to transmit periodic (and non-periodic data) and shall in said connection perform a Mode-2 resource allocation procedure (UE-autonomous) so as to select radio resources within a transmission window to be used for the transmission of the data (may further include the determination of other transmission parameters such as MCS, etc). Based on the transmission parameters (such as modulation scheme, coding rate, etc.), the vehicular UE determines the number of resource blocks necessary for the transmission, and subsequently identifies possible radio resources for the transmission of the data using the thus determined number of resource blocks. It is exemplarily assumed that only contiguous resource blocks shall be used for the sidelink transmission.

The first embodiment provides an improved radio resource allocation procedure taking into account the results obtained from the sensing procedure carried out before. According to the first embodiment, the radio resources in the transmission window (i.e., those radio resources from which the UE may select suitable radio resources for the transmission) are discriminated between radio resources of primary subframes and radio resources of secondary subframes. A secondary subframe of the transmission window shall correspond to subframes in the sensing window where the vehicular UE did not perform the resource sensing procedure and thus obtained less information through sensing. Conversely, subframes of the transmission window are primary subframes when corresponding to subframes in the sensing window where the vehicular UE has performed the sensing procedure. The prediction for a secondary subframe is thus to be considered less accurate than for primary subframes, and thus radio resources from secondary subframes are less preferable for being selected during the resource allocation procedure.

In more detail, since simultaneous transmission and reception is not supported by the vehicular UE on the sidelink interface (see background section), when the vehicular UE performs a transmission in a subframe, it cannot simultaneously perform reception operations and thus cannot perform the resource sensing procedure. The resource sensing procedure collects information on future radio resources so as to be used during the radio resource allocation procedure. As presently agreed, the sensing procedure at least involves monitoring for radio resource reservations and possibly performing energy measurements. In future 3GPP releases other types of information might be obtained during the sensing procedure, and the embodiments presented herein would still be applicable.

It is exemplarily assumed that the vehicular UE performed a transmission in subframe t, and could thus not perform the sensing procedure in that subframe. The vehicular UE could thus have potentially missed a transmission of a scheduling assignment (with or without a reservation) and/or the transmission of data by one or more other transmitting devices.

As presently standardized, periodic vehicular data (such as the CAM messages) is transmitted with a periodicity of a multiple of 100 ms (e.g., 200 ms, 300 ms, 400 ms, . . . ; the maximum periodicity between two CAM messages being 1 s and the minimum periodicity being 100 ms). Different or additional periodicities may be defined in the future and shall also be covered by the embodiments presented herein. Radio resource reservations are usually performed for periodic data, and as such are based on the above-mentioned possible periodicities of the periodic data.

In a subframe where no sensing procedure was performed, a possible missed scheduling assignment could have reserved radio resources in only some predetermined time distances, depending on the above-discussed periodicities that are possible for the periodic data. For simplicity it is assumed that a scheduling assignment generally indicates radio resources for the data transmission in the same subframe as the scheduling assignment, such that a missed radio resource reservation at subframe t potentially reserved radio resources in a subframe which is a corresponding data periodicity away, e.g., t+100 ms, t+200 ms, t+300 ms, . . . , t+1000 ms. For said reason, a vehicular UE having performed a transmission at subframe t and thus not having performed the sensing procedure at subframe t, will consider all related subframes t+100 ms, t+200 ms, t+300 ms, . . . , t+1000 ms as being secondary subframes during a possible radio resource allocation procedure (when being within the transmission window).

Similarly, a missed data or SA transmission in subframe t cannot be sensed by the vehicular UE via a received signal strength measurement. Again taking into account that periodic data transmissions may only occur in fixed time distances (e.g., 100 ms, or 200 ms, or 300 ms, or . . . , or 1000 ms), the vehicular UE considers that the energy predictions for subframes t+100 ms, and t+200 ms, and t+300 ms, and . . . t+1000 ms are not as accurate due to the lack of measurement information for subframe t.

In that way, a not-sensed subframe leads to a lack of prediction information for subsequent subframe(s), which are thus considered according to the first embodiment as secondary subframes in contrast to primary subframes for which the sensing procedure has obtained all possible information (e.g., whether or not radio resources are reserved, and energy measurements for all the frequency radio resources of that subframe).

The vehicular UE shall then select within the transmission window preferably radio resources from primary subframes over radio resources from secondary subframes. In other words, when determining of radio resources for transmitting data, only if no radio resources are available from primary subframes, the vehicular UE shall select radio resources from secondary subframes.

In general, the selection of radio resources is based on the previous determination of transmission parameters such as the modulation scheme and the coding rate to be used for transmitting the data. The vehicular UE thus determines the number of resource blocks that will be necessary for the transmission. In line with the current agreements and discussions in 3GPP, it is assumed that contiguous resource blocks are to be used for the sidelink transmissions. In the following exemplary illustrations it is assumed that three contiguous resource blocks are needed for the transmission of the data. The thus resulting resource candidates are respectively illustrated in the following figures, e.g., see FIG. 10.

In connection with this procedure, it is also advantageous to rank radio resource candidates of primary subframes separately from radio resource candidates of secondary subframes. Correspondingly, during the Mode-2 resource allocation procedure, the vehicular UE, after determining a plurality of radio resource candidates in primary subframes, will proceed to rank them in order to be able select the optimal candidate for transmitting the data. Possible radio resource candidates in secondary subframes will be ranked separately therefrom, i.e., the ranking is performed within radio resource candidates of secondary subframes only. During the radio resource allocation procedure, the vehicular UE then select the highest ranking candidate from primary subframes, and if none is available, will select the highest ranking candidate from secondary subframes.

Figure 10:
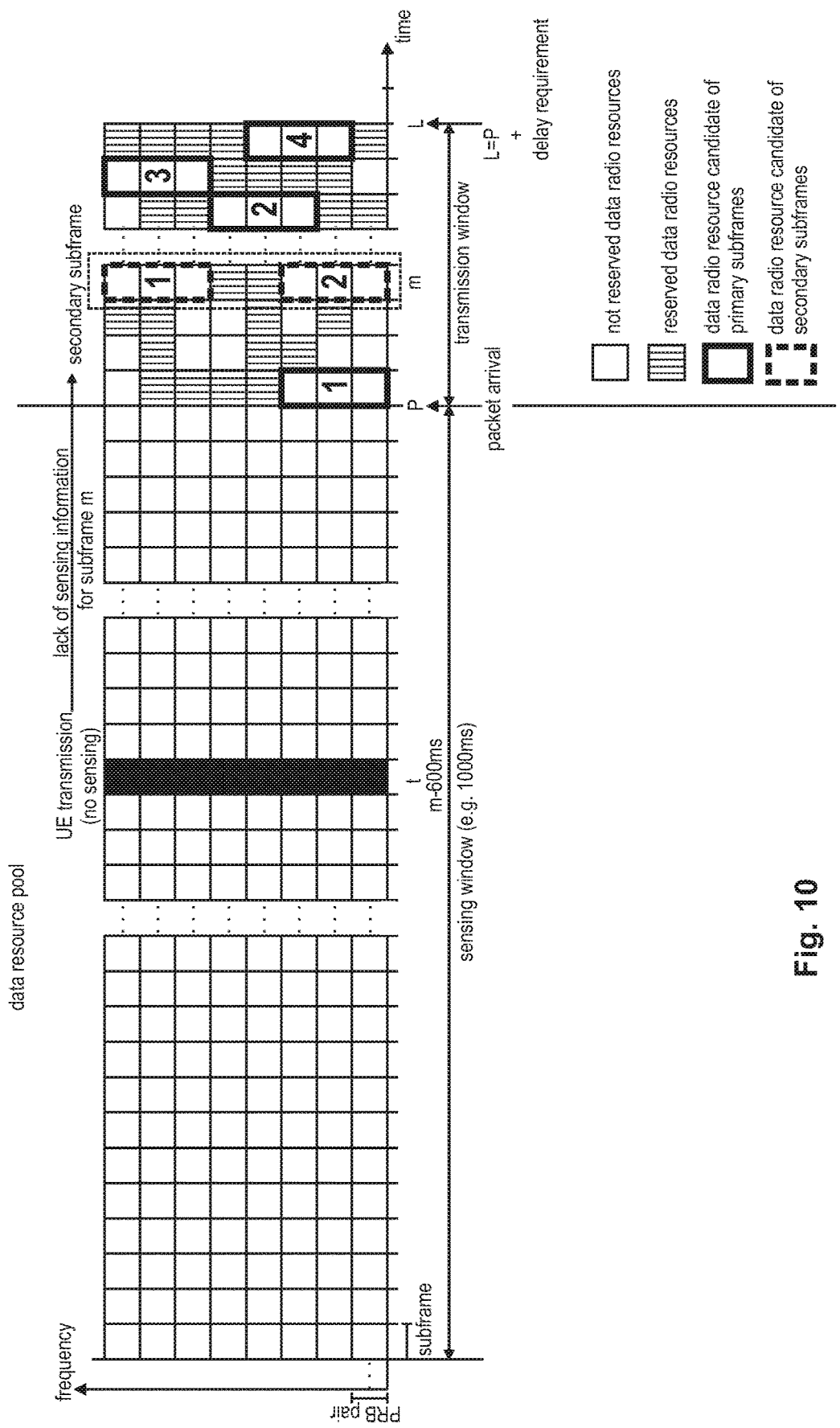
FIG. 10 illustrates frequency-time radio resources of a data resource pool for a vehicular UE according to an exemplary implementation of the first embodiment, where subframes of the transmission window are categorized as primary or secondary subframes depending on the sensing procedure.

FIG. 10 is a frequency time resource diagram of a data resource pool and exemplarily illustrating the result of sensing and radio resource allocation procedure according to one exemplary implementation of the first embodiment. FIG. 10 discloses frequency-time radio resources that are generally available for a vehicular UE to perform data transmissions via the sidelink interface, e.g., suitable radio resources from a data radio resource pool as described in the background section. Correspondingly, the sensing procedure (performed in the sensing window) is also performed over these radio resources, e.g., the radio resources of the data transmission resource pool. For ease of illustration, the relevant energy measurements in the sensing window for radio resource candidates in the transmission window, as illustrated in FIG. 9, are omitted from FIG. 10. As apparent therefrom, the UE transmission at subframe t is illustrated, as well as the resulting secondary subframe m, at t+600 ms. In the exemplary illustration of FIG. 10, it is assumed that the missed sensing opportunity in subframe t only results in a single secondary subframe m within the transmission window; for instance, since the transmission window is only 100 ms. depending on the length of the transmission window, the UE transmission at subframe t could have resulted in more than one secondary subframe (i.e., t+600 ms, and t+700 ms, t+800 ms, . . . ) The separate ranking procedure within radio resource candidates of primary subframes as well as within radio resource candidates of secondary subframes is also apparent from FIG. 10; the secondary radio resource candidates are framed in dashed lines. In particular, there are four radio resource candidates from primary subframes (ranked from 1 to 4), and there would be two radio resource candidates from secondary subframes (ranked from 1 to 2) in case no primary radio resource candidates are available.

Figure 11:
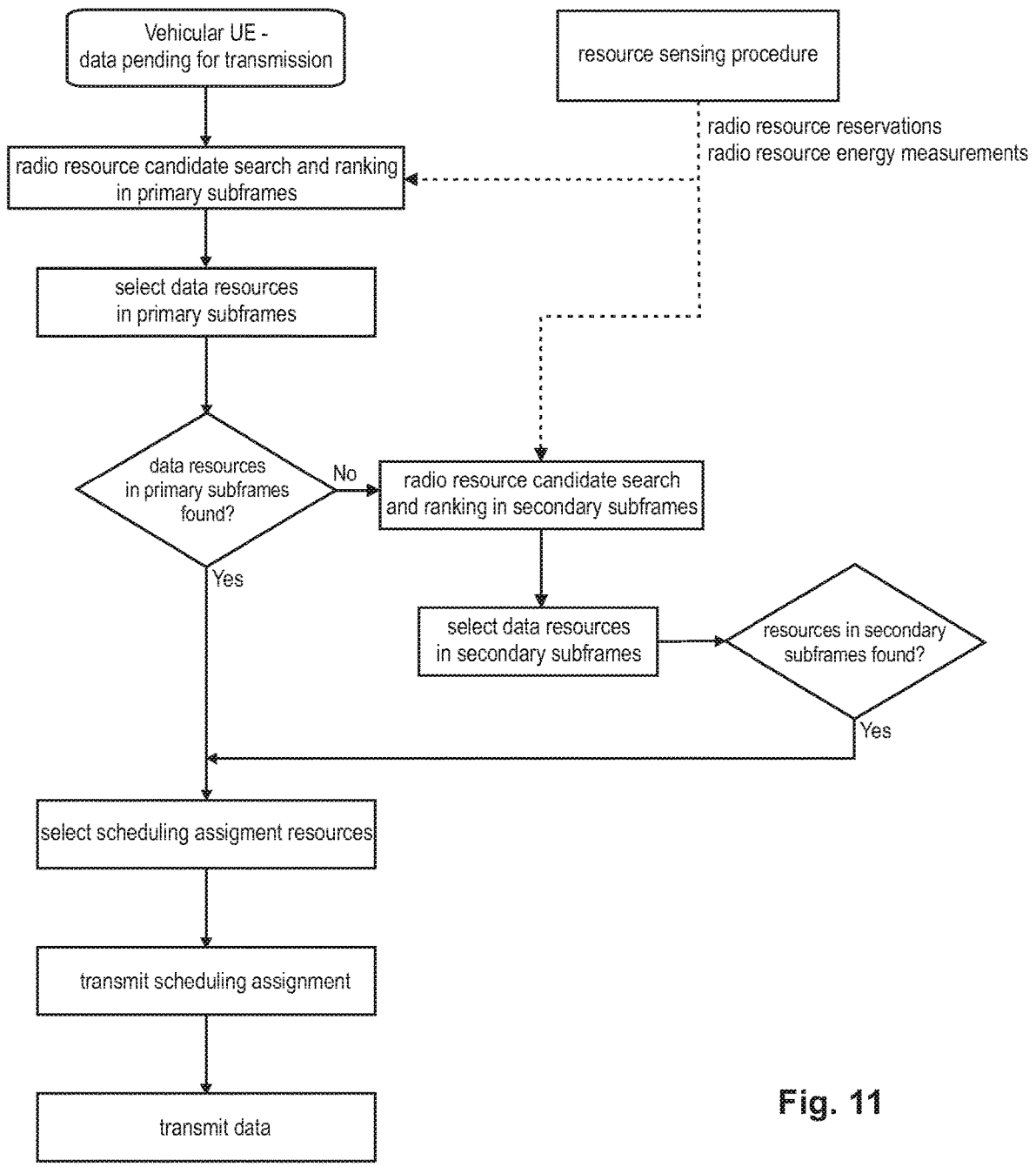
FIG. 11 is a sequence diagram for a UE behavior according to an exemplary implementation of the first embodiment.

A simplified and exemplary sequence diagram illustrating the behavior of the vehicular UE according to one exemplary implementation of the first embodiment is presented in FIG. 11. Various steps to be performed by the vehicular UE as explained above in general are depicted in FIG. 11. The resource sensing procedure is depicted separately therefrom so as to indicate that resource sensing should be performed continuously. The dashed lines from the resource sensing procedure to the radio resource candidate search and ranking steps for the primary and secondary subframes shall be understood as input of information (e.g., the radio resource reservations, and the radio resource energy measurements).

There are several options on how to perform the radio resource candidate ranking procedure. One possible, albeit disadvantageous, solution is presented in connection with FIG. 9 above. Alternatively, the candidate ranking may only be based on the time delay between the radio resource candidate and the packet arrival time; i.e., without taking the energy measurements/predictions in to account for the ranking such that candidate the resulting in only a short delay are preferred over candidates incurring a long delay. Other particularly advantageous ranking procedures will be described in the following as variants of the first embodiment. The ranking procedure may be based on the energy measurements performed during the sensing window as well as on the time distance of the radio resource candidate from the point in time the data became available for transmission. By additionally taking into account the delay that would be incurred by using a candidate for transmission of the data, the latency of data transmissions should be reduced. At the same time, the resource occupation likelihood of a radio resource candidate can also be taken into account by considering the past RSSI measurements.

The two characteristics, energy prediction and delay, considered for the ranking can be considered in different manners. In particular, the delay between the radio resource candidate and the packet arrival time may be considered first, and in case there are more than one radio resource candidates with the same time delay, the received signal strength prediction can be used for ranking the candidates with the same delay; the resource candidates are e.g., ranked from high to low in the order of increasing RSSI, such that the candidate with the lowest energy prediction is the highest-ranked candidate for that subframe. Conversely, the received signal strength prediction could be considered first, and then in case there are more than one radio resource candidates with the same received signal strength prediction, the time delay could be used for ranking, where a shorter time delay is ranked higher that a longer time delay. According to a further alternative, a function of the delay and received signal strength prediction can be used for ranking the radio resource candidates. An exemplary function could be $Z_i=X*T_i+Y*RSSI_i$. X and Y are weights respectively given to the time delay and received signal strength characteristics. $T_i$ denotes the time distance between the radio resource candidate i and the packet arrival time. $RSSI_i$ denotes the prediction for the received signal strength of the radio resource candidate i (based on previous measurements during the sensing window). The smaller the value $Z_i$ is, the higher the ranking for resource candidate i. The weights X and Y can be e.g., configured by the eNB, or otherwise predetermined.

The result of an exemplary ranking procedure which primarily considers the time delay as described above is illustrated in FIG. 10. As apparent therefrom, the primary radio resource candidate that is ranked the highest (ranking value 1) is that radio resource candidate in the primary subframes having the smallest delay with regard to the packet arrival time. The remaining radio resource candidates in the primary subframes are also ranked based on their time distance to the packet arrival time. On the other hand, the ranking procedure for the secondary subframe m has to additionally rely on the energy measurements performed during the sensing window to distinguish the two radio resource candidates; an exemplary ranking is illustrated in FIG. 10.

A further advantageous variant of the first embodiment improves the prediction of the received energy levels for a radio resource candidate. As explained in connection with FIG. 9, one possible option is to use the energy measurements in radio resources that correspond to the radio resources of the particular radio resource candidate over the whole sensing window for predicting the received signal strength of the particular radio resource candidate. This however has the disadvantage that it may not reflect the real transmission situation in this one subframe of the radio resource candidate. In order to improve the transmission energy prediction, only related subframes are to be taken into account for the prediction. In more detail, the related subframes in the sensing window are those that have a time distance of a possible data periodicity with regard to the radio resource candidates to be ranked. As currently assumed for the data transmissions, the data periodicity is a multiple of 100 ms (with a minimum of 100 ms and a maximum of 1000 ms). Consequently, for the improved energy prediction for a particular subframe m in the transmission window, the related subframes in the sensing window are m-100 ms, m-200 ms, m-300 ms, m-400 ms . . . , and m-1000 ms. Only energy measurements performed in those related subframes of the sensing window are used for predicting the energy in subframe m of the transmission window.

Figure 12:
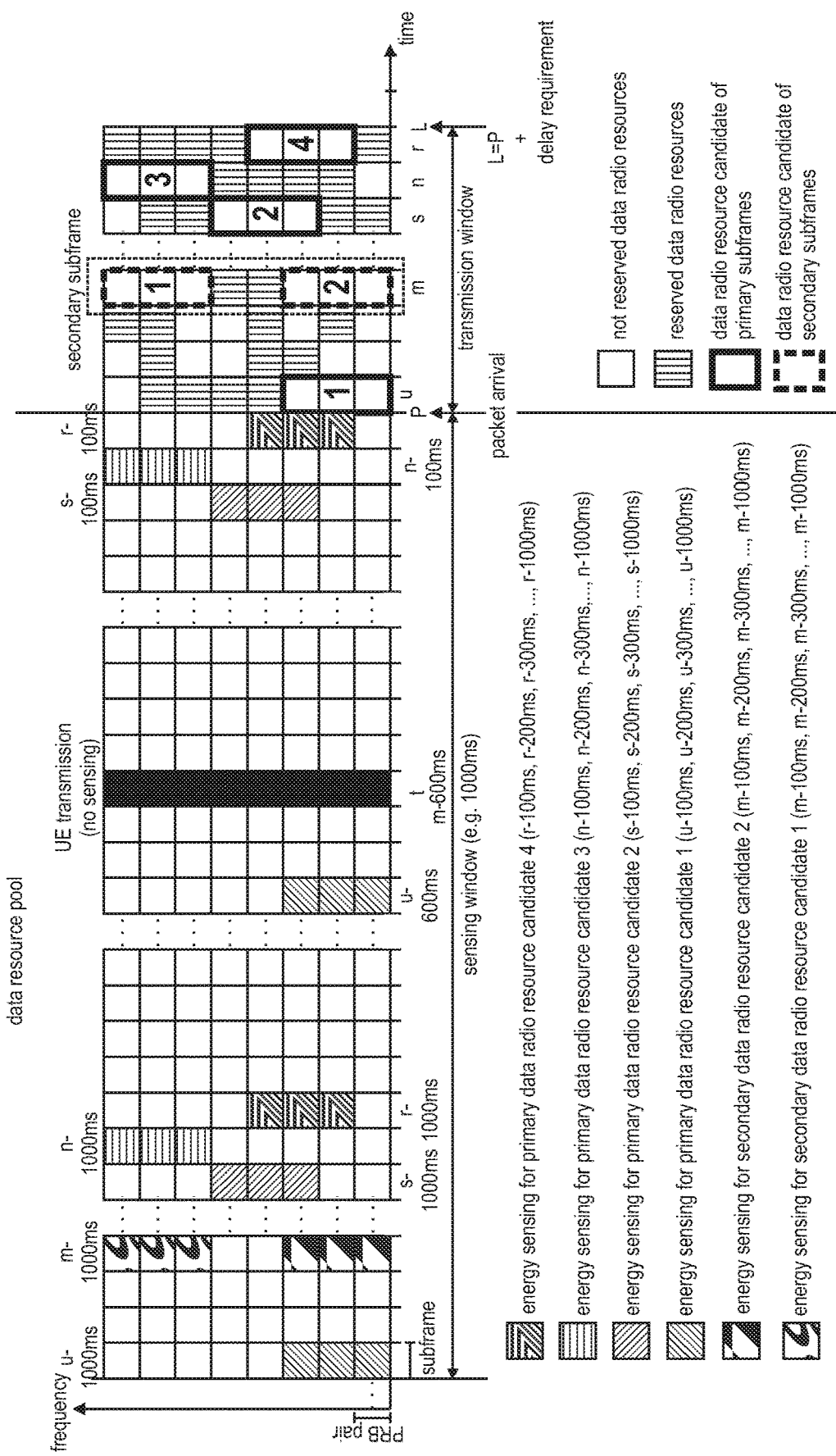
FIG. 12 illustrates frequency-time radio resources of a data resource pool for a vehicle UE according to an exemplary implementation of the first embodiment, additionally illustrating an improved energy sensing procedure in the sensing window for radio resource candidates in the transmission window.

FIG. 12 exemplarily illustrates this improved transmission energy prediction based on the assumptions already taken for FIG. 10, and distinguishes between the six radio resource candidates determined for the primary and secondary subframes. As apparent therefrom, FIG. 12 illustrates for primary radio resource candidate 1 in subframe u, energy measurements in the corresponding radio resources of subframes u-600 ms and u-1000 ms. Energy measurements at the remaining related subframes of the sensing window, i.e., u-100 ms, u-200 ms, . . . , u-500 ms, u-700 ms, u-800 ms, u-900 ms, are also considered even though they are not shown in FIG. 12 for ease of illustration. Similarly, both the radio resource candidates of secondary subframe m are related to subframes m-100s, m-200 ms, . . . , m-1000 ms in the sensing window, although energy measurements in different radio resources of the related subframes are used. Correspondingly, FIG. 12 marks the related radio resources in subframes m-1000 ms used for the energy prediction. It should be noted that the energy measurements in the radio resources of subframe m-600 ms, were not possible due to the transmission performed by the vehicular UE. As discussed before, a possible periodic transmissions with a periodicity of 600 ms having an impact on subframe m of the transmission window would thus not be sensed, which is one of the reasons to categorize the subframe m as being only secondary for the radio resource allocation procedure. The received signal strength (i.e., energy) measured in the radio resources of the related subframes can then be e.g., averaged for obtaining a prediction of the radio resource candidate in the subframe of the transmission window.

The advantage is that the improved energy prediction is more accurate as it takes into account the possible periodicities of data transmissions.

Other advantageous implementations of the first embodiment provide solutions for those cases where no suitable radio resources in either the primary or secondary subframes are found. As discussed before, a preemption procedure allows selecting radio resources from among the radio resources in the transmission window even when they are already reserved by other transmitting devices.

Figure 13:
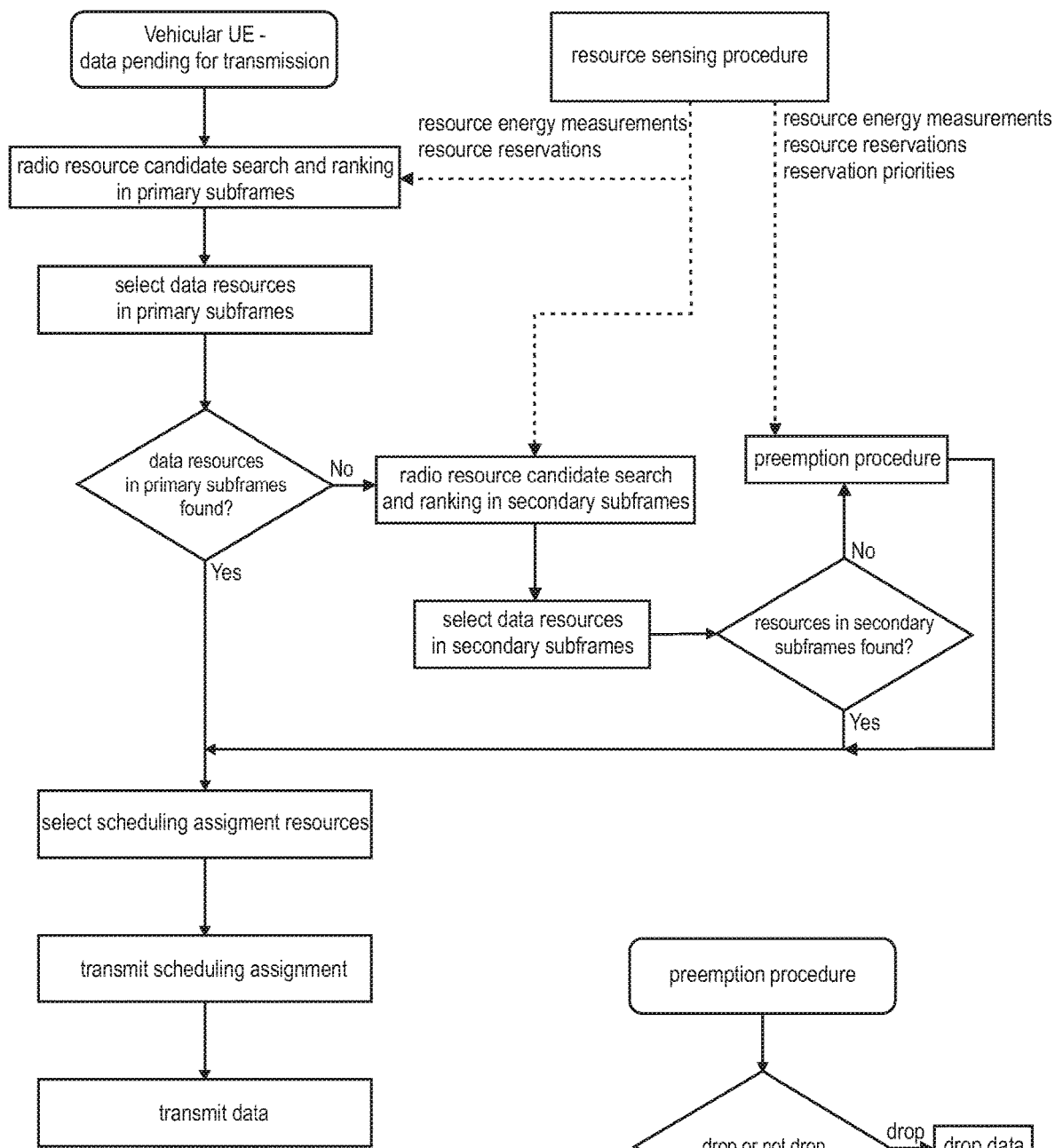
FIG. 13 is a sequence diagram for a UE behavior according to an exemplary implementation of the first embodiment, additionally illustrating a preemption procedure to be performed if no resources are found in the primary and secondary subframes.

FIG. 13 is an exemplary sequence diagram for the UE behavior based on the diagram of FIG. 11 and extended with the preemption procedure as a step in case the vehicular UE is not able to find resources in the secondary subframes (after also failing to find resources in the primary subframes). As apparent from FIG. 13, after determining radio resources during the preemption procedure, the vehicular UE proceeds to determine corresponding radio resources for the scheduling assignment and then transmits both the SA and the data. Furthermore, the preemption box receives information from the resource sensing procedure as input, such as the energy measurements on the radio resources, the radio resource reservations made by other devices, and possibly also information on the priority of the radio resource reservations. The latter information requires that priority information (such as the PPPP, ProSe-Per-Packet-Priority) is transmitted together with the radio resource reservation and is thus decoded and stored by the vehicular UE during the sensing procedure, too.

Figure 14:
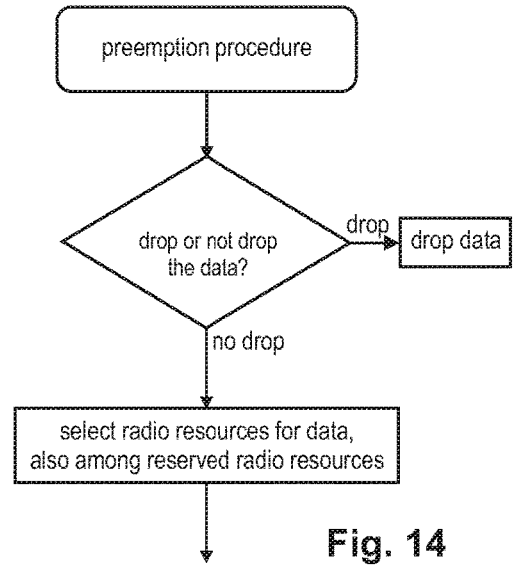

FIG. 14 is a simplified and exemplary sequence diagram for the preemption procedure that can be performed by the vehicular UE in cases where no radio resources are available and should be seen as one possible implementation of the preemption procedure illustrated in FIG. 13. An optional check to be performed at the beginning of the preemption procedure is whether or not the data to be transmitted can be dropped (i.e., discarded so as to not be transmitted). In one example implementation, the vehicular UE determines whether or not the data should be dropped based on the priority of the data, which can be compared to a suitable priority threshold. The data is usually associated with a ProSe-Per-Packet-Priority (PPPP) which indicates the priority of the data. A suitable priority threshold may be defined in the vehicular UE e.g., by the eNodeB, and is used to distinguish between data that can be dropped or not. If the priority is not high enough (e.g., falls under the priority threshold), the data is dropped; otherwise, the preemption procedure proceeds to select radio resources to be used for the transmission of the data this time however additionally taking into account reserved radio resources that were initially excluded from the previous candidate search in the primary and secondary subframes. As mentioned above, the dropping of the data is an optional check performed by the vehicular UE, and as such may be configurable e.g., by the eNB or upper layers of the vehicular UE.

Although illustrated to be part of the preemption procedure, the drop check can also be performed outside the actual preemption procedure, such that the preemption procedure (without drop check) is only performed when the packet is not dropped.

Moreover, the decision on whether to drop or not drop data can be done by a higher layer of the vehicular UE (such as the RRC or application layer.)

Preemption refers to the process of selecting and using radio resources that are already reserved by other transmitting devices to transmit the data. Some of the reserved radio resources are thus "overwritten" by the own transmission, which may cause severe interference and should thus be avoided if possible. Nevertheless, when the data is important enough, the vehicular UE should determine one or more radio resource candidates having a suitable resource block size which—in part or in full—comprises reserved radio resources. If there is more than one resource candidate available, the vehicular UE needs to determine the most suitable candidate. One possible option is to perform a random selection of the candidates across the complete transmission window, or preferably in primary subframes and then in secondary subframes as already discussed before.

According to advantageous implementations of the first embodiment, the selection of radio resource candidate during the preemption procedure is improved so as to mitigate any problems caused by the preemption, by taking into account the priority of the radio resources and/or the RSSI prediction determined during the sensing procedure in the sensing window. In one example, the vehicular UE performs preemption by selecting the radio resource candidate with having the lowest priority of reserved radio resources. Then, if several candidates with the same priority remain, the vehicular UE may choose that candidate having the lowest RSSI prediction. In a second example, the vehicular UE selects a radio resource candidate having the lowest RSSI prediction level, and in case several candidates remain, the candidate with radio resources having the lowest priority is selected for transmitting the data. Alternatively, a function may be defined based on the two parameters, reservation priority and RSSI, weighted individually. An exemplary function could be $Z_i = w1 * 1/P_i + w2 * RSSI_i$. w1 and w2 are weights respectively given to the priority (lowest priority value is highest priority) and received signal strength characteristics. $P_i$ denotes the priority given to a particular radio resource reservation as part of resource candidate i, and $RSSI_i$ denotes the prediction for the received signal strength of the radio resource candidate i. The vehicular UE shall select a radio resource candidate having a small (smallest) $Z_i$ value.

Optionally, the priority of the reservation may be compared to the priority of the data such that only reserved radio resources should be preempted having a lower priority than the data to be transmitted. As another option, it may be possible to define corresponding priority and energy thresholds so as to be able to restrict the radio resource selection to only the "optimal" radio resources that fall below both thresholds; radio resources above the thresholds are filtered out. As an optional addition, the preemption procedure may also distinguish between primary and secondary subframes, and then shall preferably select a candidate from a primary subframe over a candidate in a secondary subframe.

In addition or alternatively, the preemption procedure should preferably determine a radio resource candidate for transmission of the data which overrides the least amount of reserved radio resources. In particular, in view of that only a set of contiguous resource blocks can be used for the data transmission over the sidelink, preempting only a few reserved resource blocks might suffice to obtain a sufficiently large resource block set to transmit the data. Thereby, interference with other transmitting UEs is reduced.

As a further possible criterion for the preemption procedure, reserved radio resources may be chosen in such a way so as to minimize the number of other devices that would be affected by the preemption or to maximize the number of other devices so that each device would be affected less by the preemption while still being able to decode the data.

In case several candidates remain after taking the two or three parameters into account (reservation priority, data priority, or RSSI) according to any one of the above examples, the vehicular UE may randomly select one of the remaining radio resource candidates.

By taking the energy predictions into account for the preemption procedure, strong interference of the data transmission performed by the vehicular UE with the preempted data transmission of a closely located vehicular UE should be avoided.

After thus determining suitable radio resources for the transmission of the data, the vehicular UE proceeds, as illustrated in FIG. 13, to select resources for transmitting the scheduling assignment, and then transmits both the scheduling assignment as well as the data.

According to a further advantageous implementation of the first embodiment, the congestion level of the sidelink channel is taken into account for the radio resource allocation procedure performed at the vehicular UE. The congestion level of the sidelink channel (may also be termed channel busy ratio, CBR) is determined by the vehicular UE e.g., by comparing the energy level of sufficient samples with a threshold across the whole bandwidth or only within one resource pool. For example, if 90% of the samples have the energy level higher than the threshold, the CBR is 90%. The threshold could be fixed or configured by eNB or preconfigured. CBR measures the busy level of a carrier or a resource pool. The CBR may be used by the vehicular UE so as to determine whether or not to drop the data in view of the channel status. In general, this CBR check is optional and may be configured e.g., by the eNodeB or pre-configured (e.g., by the operator), thereby configuring the UE on whether and how the CBR check is to be performed. For instance, if the eNodeB is conservative and wants to protect the sidelink carrier, it may thus configure some or all UEs in its cell (e.g., by a system information broadcast) to perform such a CBR check. On the other hand, if the eNodeB is interested in achieving a higher throughput, it may configure the UEs to not perform this CBR check. One possible implementation of the CBR check takes the priority of the data to be transmitted and compares same with a priority threshold, which can be optionally dependent on the CBR detected for the sidelink channel. For instance, only if the priority of the data that is to be transmitted is sufficiently high, the procedure will proceed despite a high congestion level of the channel. On the other hand, low priority data may be dropped in view of a busy channel.

The traffic type of the data to be transmitted can also be taken into account in the CBR dropping function, either in addition or alternatively to the priority of the data. For instance, different thresholds can be defined for safety traffic and non-safety traffic. Assuming a priority level from 1 to 5, where the higher the number the lower the priority. For a CBR of 90%, safety traffic with a priority level 5 and non-safety traffic with priority levels 5, 4 and 3 should be dropped. On the other hand, if CBR is 80%, safety traffic will never be dropped, while only non-safety traffic with a priority level 5 should be dropped. If CBR is 70%, safety traffic will never be dropped, while non-safety traffic with priority level 5 or 4 shall be dropped, etc.

If the data is dropped, the responsible higher layer is informed about the failure to transmit the data, e.g., such that higher layer could decide to transmit the data later again or drop the data also at higher layer and inform user of the failed transmission.

Figure 15:
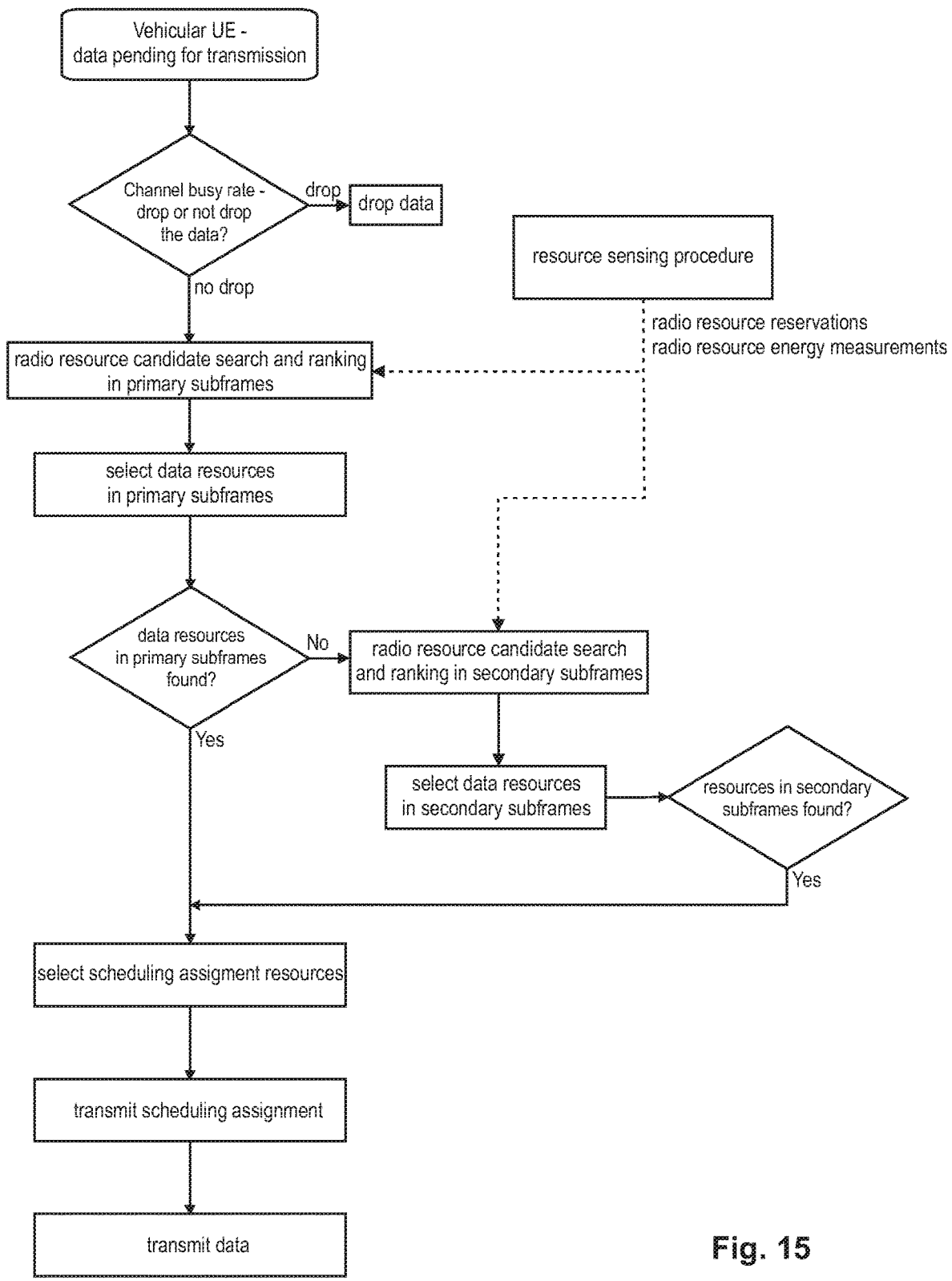
FIG. 15 is a sequence diagram for a UE behavior according to an exemplary implementation of the first embodiment, additionally illustrating a channel busy rate dropping function.

FIG. 15 is an exemplary sequence diagram based on the diagram of FIG. 11 and extended with the CBR check as discussed above. In particular, after data becomes available for transmission, the vehicular UE may decide whether or not to drop the data by taking into account the channel busy rate. The procedure as known from FIG. 11 and described above in detail is then continued if the vehicular UE decides to not drop the data.

The CBR check can be either considered part of the resource allocation procedure or a step preceding the resource allocation so as to determine whether the resource allocation should be started at all.

Moreover, the radio resource sensing procedure can be performed per radio resource pool configured in the vehicular UE for the Mode-2 resource allocation. In said case, whether and how the vehicular UE is to use the CBR check can be configured per resource pool. For instance, during the configuration of the data resource pool(s), the eNodeB might indicate whether and how CBR checks are to be performed. For out of coverage UEs and the corresponding radio resource pools, the CBR configuration may be part of a pre-configuration for each resource pool.

Figure 16:
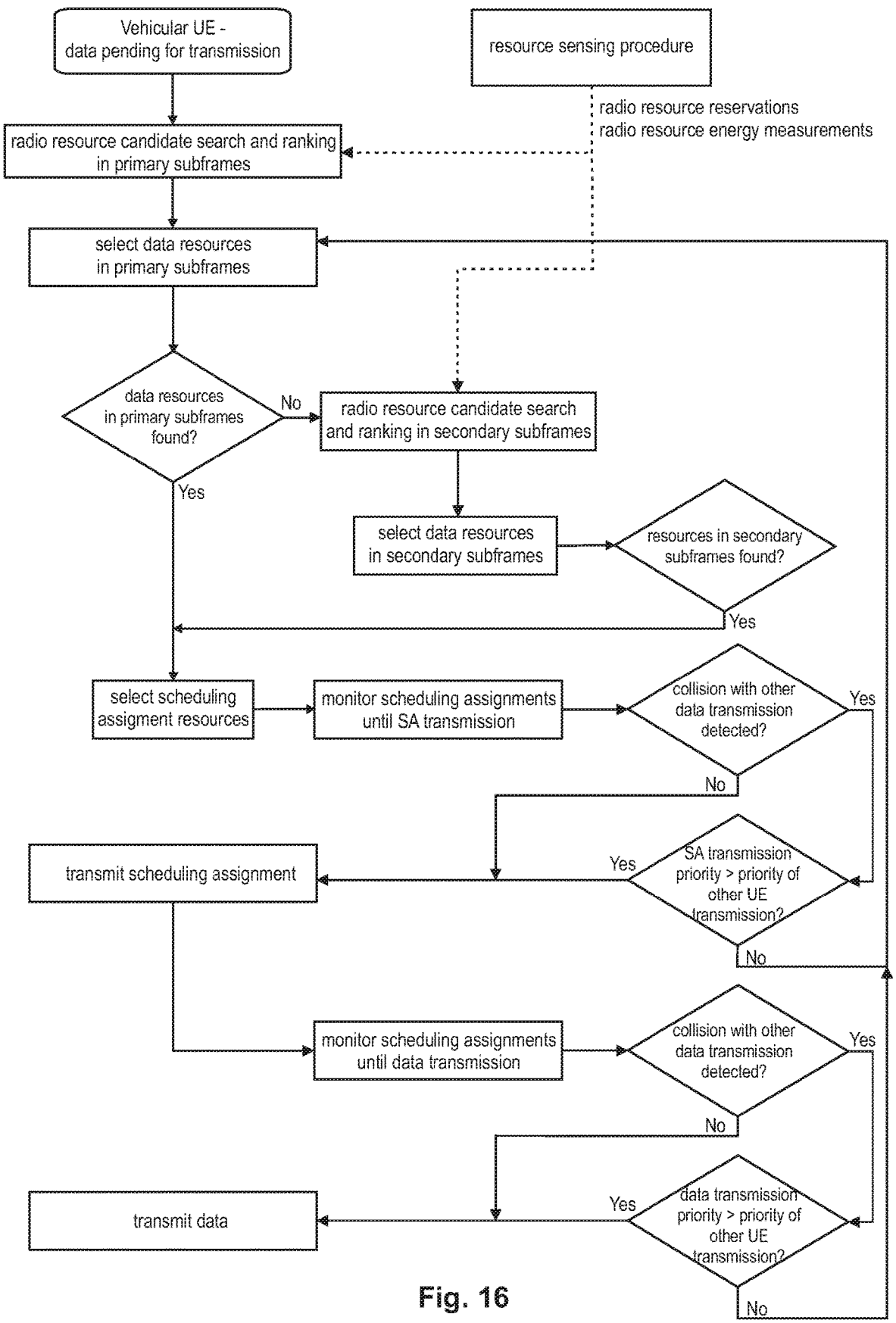
FIG. 16 is a sequence diagram for a UE behavior according to an exemplary implementation of the first embodiment, additionally illustrating a collision function for detecting possible collisions of the SA and data transmission.

According to further advantageous implementations of the first embodiment, collision checks are provided so as to determine whether the planned transmission of the scheduling assignment respectively the data collides with the data transmission of another UE. FIG. 16 is an exemplary sequence diagram based on the diagram of FIG. 11 and extended with one implementation of the collision check as discussed in the following. As apparent from FIG. 16, after selecting suitable resources for transmitting the scheduling assignment and the data, the vehicular UE continues performing the sensing procedure and thus monitors for scheduling assignments transmitted by other UEs possibly making resource reservations for the future. Based on the received scheduling assignments from other UEs, the vehicular UE can thus check whether the planned transmission of the scheduling assignment collides with an announced transmission by another UE as indicated by a monitored scheduling assignment. In case of collision, the vehicular UE may decide on how to further proceed, and may e.g., compare the priorities of the two colliding transmissions; i.e., its own SA transmission and the transmission of the other UE. In case the own SA transmission has a higher priority, the vehicular UE continues with the transmission of the scheduling assignment as already planned. In the other case, the vehicular UE may return to the first step(s) of the radio resource allocation procedure so as to determine new radio resources for the scheduling assignment, and if necessary also for the data transmission. Alternatively, the SA and data is dropped in case of collision; especially, when the priority of the own SA transmission is lower.

The collision detection functions in a similar manner for the data transmission. It is assumed that the scheduling assignment for a data transmission was transmitted. The sensing procedure is continuously performed by the vehicular UE until the time of the data transmission, and thus possible data transmissions by other devices colliding with the own data transmission may be detected. In such a collision case, the vehicular UE may e.g., compare the priorities of the two data transmission. In case the own data transmission has a higher priority, the vehicular UE continues with the transmission of the data as planned before. In the other case, the vehicular UE may have to return to first steps of the radio resource allocation procedure, so as to determine new radio resources for the data and SA transmission. Alternatively, the data is dropped in case of collision; especially, when the priority of the own data transmission is lower.

In the above, different implementations of the first embodiment have been described, where a "basic" implementation is described in connection with FIG. 11, and extensions to said "basic" implementation are described respectively in FIGS. 13, 14, 15, and 16. Although the extensions are described and illustrated separately, some or all them can be combined so as to form a complete UE behavior, which then comprises the preemption procedure of FIG. 13, and/or the CBR dropping function of FIG. 15, and/or the collision check of FIG. 16.

In the above, it was assumed that the vehicular UE always uses the results of the sensing procedure for the UE autonomous resource allocation (Mode 2). However, whether and how to use sensing for the resource allocation may instead be configurable and/or dependent on the radio resource pool from which the vehicular UE is selecting radio resources for the transmission. In more detail, in one implementation, the eNodeB, responsible for the vehicular UE, controls whether and how the sensing procedure should affect the radio resource allocation. For instance, the eNodeB may broadcast a corresponding configuration in its cell, such that all vehicular UEs in the cell receiving the configuration learn whether and how to use sensing for the UE autonomous resource allocation. Alternatively, a dedicated message is transmitted from the radio base station to only one or more vehicular UEs so as to control whether and how the sensing procedure should be implemented in those vehicular UEs.

Second Embodiment

In the following, a second embodiment will be described which can be used in combination with the various implementations of the first embodiment. In connection with the first embodiment, it was simply assumed that the vehicular UE selects the resources for transmitting the scheduling assignment, without going into detail on how the vehicular UE actually does the resource selection. As explained in the background section, the selection of resources for the transmission of the scheduling assignment is well-defined in previous releases of 3GPP. In brief, for the UE autonomous radio resource allocation (Mode 2) the vehicular UE may randomly select radio resources from a corresponding scheduling assignment resource pool, and may further select a T-RPT pattern for the repetition of this scheduling assignment. However, while 3GPP discussed and agreed to implement improvements for the resource selection for data transmissions (the radio resource reservation mechanism as well as the sensing procedure were introduced, as discussed above), nothing has been discussed or agreed upon with regard to how the transmission of scheduling assignment can be improved for future releases. One motivation for the agreed improvements for V2X data transmissions is to increase the reliability of such transmissions, which might not be guaranteed with a pure random selection of radio resources for the data transmission (e.g., in terms of rate of collision). For instance, the number of vehicular UEs will presumably increase in the future, and the random resource selection mechanism for the transmission of the scheduling assignments might lead to an increased number of failures due to collisions. However, a robust transmission of the scheduling assignment, particularly in the environment of vehicular communication, is similarly important as a robust transmission of data.

The second embodiment thus provides an improved UE-autonomous radio resource allocation procedure for selecting radio resources for the scheduling assignment transmission. The transmission of scheduling assignments is improved so as to mimic the improvements foreseen for the data transmissions as discussed for the first embodiment. Correspondingly, implementations of the second embodiment provide for a resource sensing procedure performed by the vehicular UE for the radio resources of one or more SA resource pools that are usable by the transmitting device for transmitting scheduling assignments. It should be noted that the radio resource sensing procedure as described in the first embodiment senses possibly different radio resources, namely those of a data resource pool usable by the transmitting device for transmitting data. The radio resources of the scheduling assignment resource pool and the radio resources of the data resource pool may however overlap. In any case, in a similar manner as described in detail in the first embodiment, the vehicular UE shall acquire information on future scheduling assignment radio resources, by continuously performing the sensing procedure in those radio resources.

As will be described in more detail in the following implementation of the second embodiment, radio resource reservation shall be also implemented for the transmission of the scheduling assignments, not only for the transmission of data as described in the first embodiment. The radio resource reservation for scheduling assignments and data can be similar. In brief, by providing suitable indications in the scheduling assignment, the radio resources used for the transmission of the current scheduling assignment can be reserved for one or more future scheduling assignment transmissions.

By monitoring scheduling assignments transmitted by other devices, the resource sensing procedure shall thus also allow the vehicular UE to acquire information as to whether and which radio resources are reserved by other transmitting devices for the transmission of scheduling assignments. These reserved radio resources may then be excluded from the radio resource allocation procedure that is performed by the vehicular UE to select radio resources for transmitting a scheduling assignment. The radio sensing procedure may also comprise energy measurements (e.g., the received signal strength, RSSI) throughout the frequency resources configured for the transmission of scheduling assignments. In the future, other types of information may be collected as well. The sensing procedure thus collects information on the future radio resources to be used for transmitting scheduling assignments, which can be used during the resource allocation procedure to select optimal radio resources for transmitting a scheduling assignment.

It is assumed that the vehicular UE shall transmit periodic data and perform a UE-autonomous radio resource allocation procedure so as to determine resources for transmitting the scheduling assignment and the pending data.

As already discussed in detail in connection with the first embodiment, the radio resource allocation procedure can be improved by discriminating between radio resources of primary subframes and radio resources of secondary subframes, taking into account the results obtained from the sensing procedure. A secondary subframe of the transmission window shall correspond to subframes in the sensing window where the vehicular UE did not always perform the resource sensing procedure and thus obtained less information through sensing, compared to primary subframes which correspond to subframes in the sensing window where the vehicular UE has always performed the sensing procedure and thus obtained all possible information. The vehicular UE may thus have missed a reservation for a scheduling assignment transmission by another UE in a secondary subframe or misses an energy measurement influencing the energy prediction for the secondary subframe as explained in detail for the first embodiment.

Thus, the prediction for secondary subframes is less accurate than for primary subframes, and radio resources from secondary subframes are thus to be selected less preferable than radio resources from primary subframes.

As a result, this improvement of the resource allocation procedure as presented in detail for the first embodiment in connection with the selection of radio resources for the data transmission can be applied according to the second embodiment to the selection of radio resources for the transmission of scheduling assignments.

Figure 17:
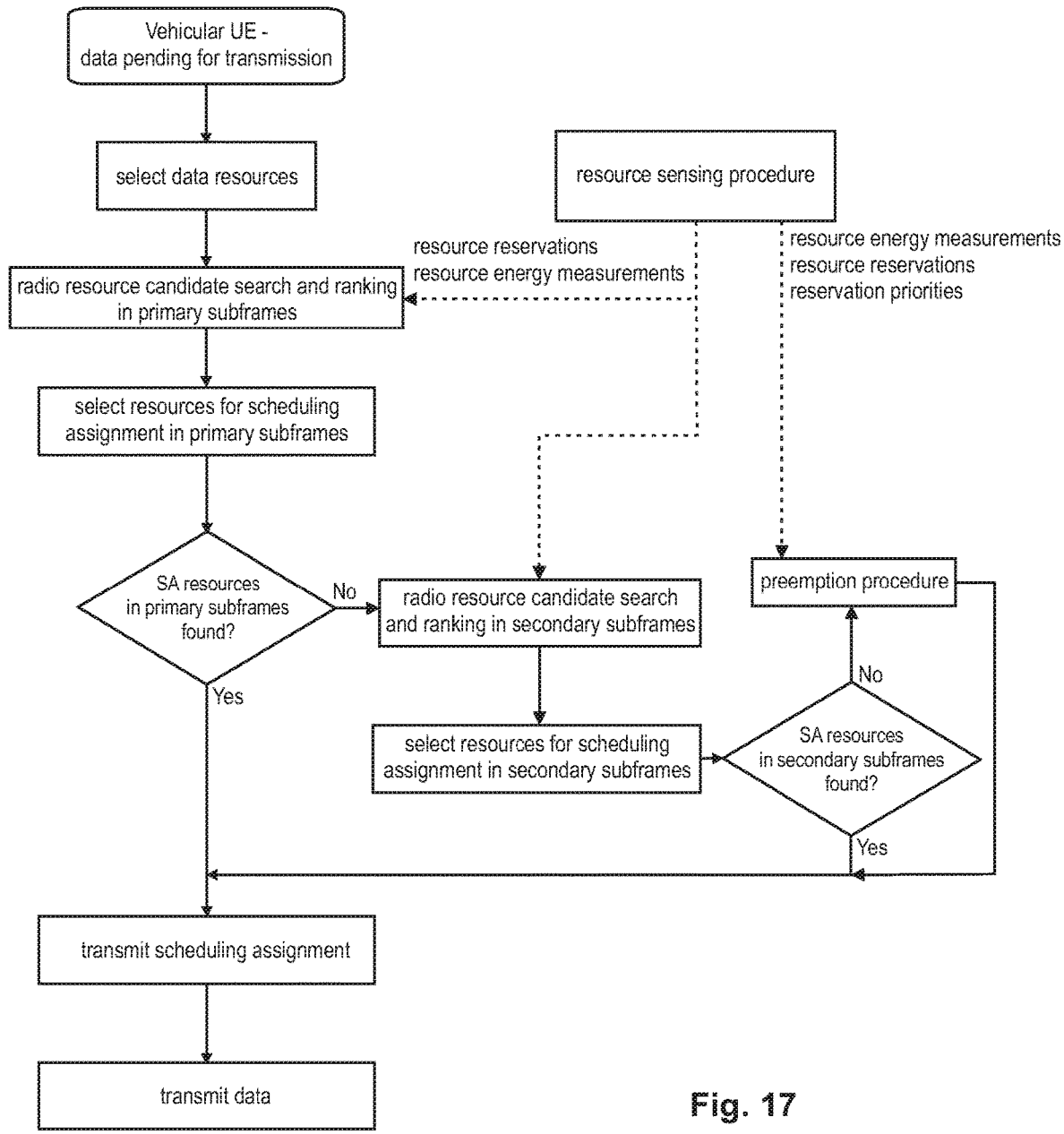
FIG. 17 is a sequence diagram for a UE behavior according to an exemplary implementation of the second embodiment.

FIG. 17 is a sequence diagram, similar to FIG. 11 of the first embodiment, illustrating an exemplary and simplified UE behavior according to an implementation of the second embodiment. As apparent therefrom, the selection of radio resources for transmitting the scheduling assignment is divided into a search in primary subframes and a subsequent search in secondary subframes. In particular, after data becomes available for transmission, the vehicular UE shall select within the transmission window radio resources for the SA transmission preferably from primary subframes, and in case no radio resources for the SA transmission are available from primary subframes, the vehicular UE shall search for radio resources for the SA transmission within secondary subframes. The procedure then continues with the transmission of the scheduling assignment and the subsequent transmission of the pending data.

Figure 18:
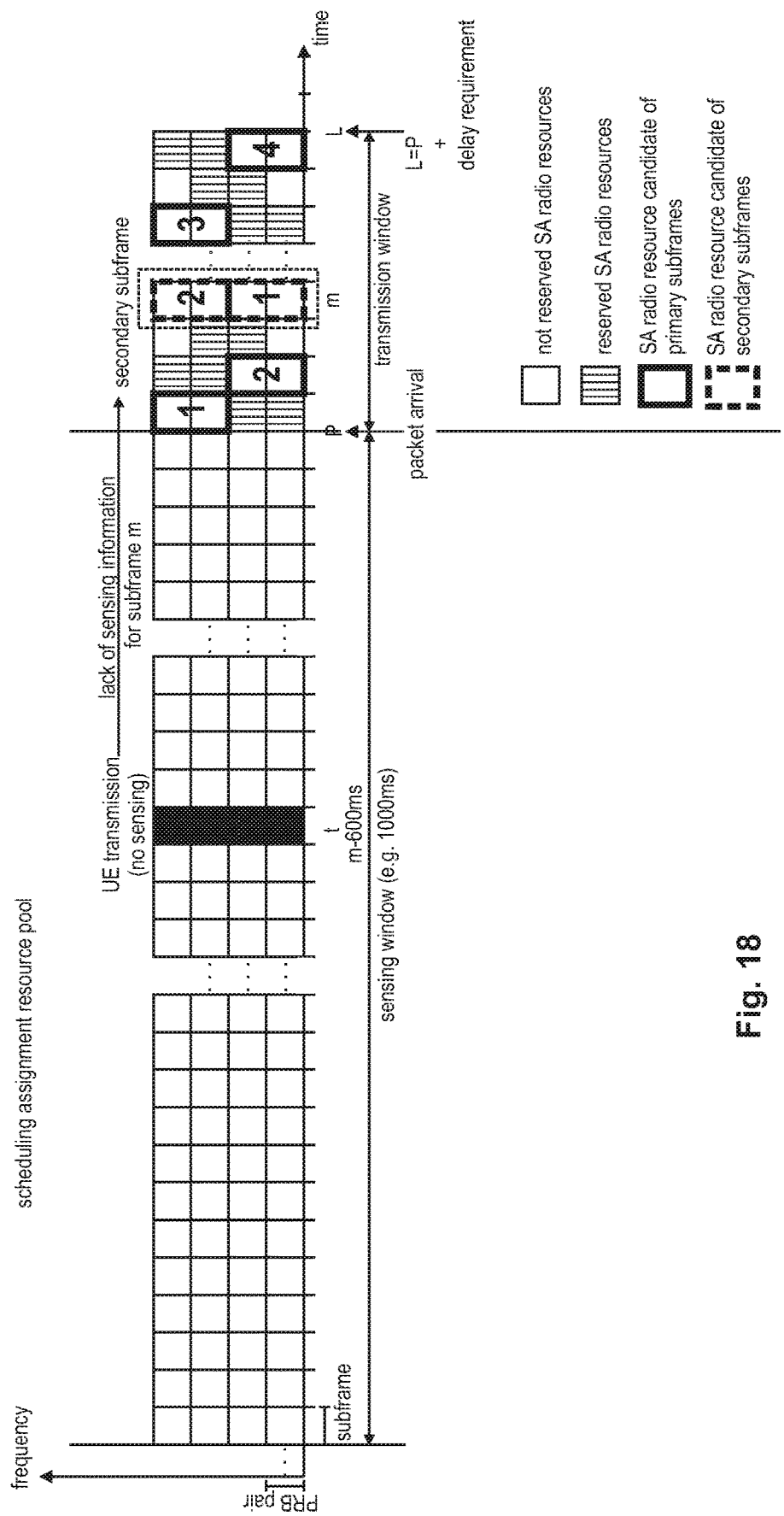
FIG. 18 illustrates frequency-time radio resources of a scheduling assignment resource pool for a vehicular UE according to an exemplary implementation of the second embodiment, where subframes of the transmission are categorized as primary or secondary subframes depending on the sensing procedure.

FIG. 18 illustrates the frequency-time radio resources for a scheduling assignment resource pool, the resources being available to the vehicular UE to transmit scheduling assignments. In a similar manner as done in FIG. 10, FIG. 18 illustrates how primary and secondary subframes are defined within the transmission window as a result of a not-performed sensing procedure in one subframe of the sensing window. Also for the transmission of the scheduling assignment, the vehicular UE must first determine suitable transmission parameters and thus the number of resource blocks that will be necessary for the SA transmission. As presently agreed, two physical resource block pairs shall be used for the transmission of the scheduling assignment. The vehicular UE then determines possible radio resource candidates that would be available for the transmission of the scheduling assignment, where an exemplary result of the candidate search is illustrated in FIG. 18

Radio resource candidates of primary subframes shall be ranked separately from radio resource candidates from secondary subframes, e.g., in the same or similar manner as discussed for the first embodiment. This is also illustrated in FIG. 18, which shows four primary SA radio resource candidates and separately two secondary SA radio resource candidates. In particular, the various different implementations of the ranking procedure as discussed for the transmission of data according to the first embodiment can also be reused for ranking the radio resource candidates usable for transmitting the scheduling assignments. For instance, ranking as discussed in connection with FIG. 9 is possible although disadvantageous. Alternatively, the candidate ranking may be based only on the time delay between the radio resource candidate and the packet arrival time, specifically taking into account that the scheduling assignment needs to be transmitted before (or at the same subframe) as the data transmission. Another option for the candidate ranking considers both the time delay and the energy prediction for the radio resource candidate based on the energy measurements performed during the sensing procedure; various different implementations are presented above in connection with the first embodiment and can be reused herein for implementations of the second embodiment.

Particularly advantageous implementations of the first embodiment improve on the energy prediction, as explained in connection with FIG. 12. These improved energy measurements and predictions can also be applied to the resource sensing procedure performed by the vehicular UE on radio resources usable to transmit scheduling assignments. Correspondingly, the energy prediction for a particular resource candidate in subframe m shall take into account measurements in the sensing window of only subframes that are related to the subframe of the resource candidate, i.e., spaced away by the possible periodicities, m-100 ms, m-200 ms, m-300 ms, . . . , m-1000 ms.

As illustrated in FIG. 17, a preemption procedure can be foreseen during the resource allocation procedure for those cases where no suitable radio resources can be found within the primary and secondary subframes. In a similar manner as discussed in detail in the first embodiment, radio resources reserved by other UEs for the transmission of scheduling assignments may be preempted by the vehicular UE so as to be still able to transmit the scheduling assignment. Furthermore, the preemption procedure may comprise a determination as to whether the scheduling assignment shall be dropped, wherein the determination can be based on the priority of the data for which the scheduling assignment will be transmitted, which can be compared to a suitable priority threshold. If the data, and thus the scheduling assignment, has a sufficient priority, the vehicular UE may proceed to determine resource candidates for the transmission of the scheduling assignment, this time also taking into account reserved radio resources. Various advantageous implementations of the preemption procedure are discussed in detail in connection with the first embodiment and considers can also be reused for improving the selection of radio resource candidates for the transmission of scheduling assignments. For instance, the priority of the reserved radio resources and/or the RSSI prediction determined during the sensing procedure in the sensing window can be taken into account. Moreover, the priority of the reserved radio resources can be compared to the priority of the data that shall be transmitted. Also the preemption procedure may distinguish between primary and secondary subframes and shall select radio resource candidates preferably from primary subframes.

In summary, the vehicular UE thus selects optimal radio resources for transmitting the scheduling assignment. As discussed above, the vehicular UE shall also reserve radio resources for next transmissions of the scheduling assignments.

In some implementations of the second embodiment, whether or not the vehicular UE shall apply semi-persistent scheduling (e.g., radio resource reservation and the sensing procedure) to the transmission of scheduling assignments can be configurable. According to one exemplary implementation, the eNodeB controlling the vehicular UE can decide whether some or all UEs in its cell shall improve the scheduling assignment transmission by additionally reserving radio resources for future transmissions of scheduling assignments and performing the radio resource selection based on results of the sensing procedure in radio resources of the corresponding SA resource pool. The eNodeB can then inform the vehicular UE(s) accordingly. For instance, in case that all UEs in the cell of an eNodeB shall be configured in the same manner, the eNodeB may broadcast a system information message in its cell, such that all UEs receiving said broadcast message configure the SA transmission procedure as instructed.

On the other hand, how to transmit scheduling assignments may be coupled to the transmission procedure followed by the vehicular UE when transmitting data. Consequently, if the vehicular UE applies semi-persistent scheduling to the data transmissions, it shall also apply semi-persistent scheduling to the corresponding SA transmissions; and likewise for the sensing procedure. When the UE shall not use the semi persistent scheduling, the transmission of the scheduling assignment can be handled in the same manner as described in the prior art, e.g., by randomly selecting radio resources from a suitable SA radio resource pool without any reference to the results of a sensing procedure.

Alternatively or in addition to transmitting a broadcast message in its cell, the eNodeB might transmit a dedicated message to selected vehicular UEs, and thus these UEs will configure themselves according to the instruction in the dedicated message. Thereby, the eNodeB can selectively configure the vehicular UEs to perform semi-persistent scheduling for transmitting the scheduling assignments.

The configuration of whether and how to perform the scheduling assignment transmission can be also dependent on the particular SA resource pool such that semi-persistent scheduling as well as the sensing procedure is performed when selecting radio resources for the transmission of scheduling assignments from particular configured radio resource pool(s). A corresponding indication when configuring the radio resource pools at the beginning might be sufficient, e.g., one bit for the data and one bit for the SA transmissions.

As will be described in the following, the second embodiment provides several implementations on how the devices receiving a scheduling assignment deduce whether or not the received scheduling assignment also reserves radio resources for the transmission of one or more future scheduling assignments. One option is to provide a corresponding field (e.g., one bit) in the scheduling assignment, wherein one bit value indicates that the scheduling assignment also reserves the radio resources (e.g., those radio resources used for transmission of the current scheduling assignment) also for the transmission of one or more future scheduling assignments. Conversely, the other bit value of the scheduling assignment field is understood by the receiving entities as indicating that no radio resource reservation is made for the scheduling assignment transmission. Alternatively, instead of providing a separate field for the reservation of radio resources for the scheduling assignments, other implementations of the second embodiment are based on an implicit indication, e.g., using the corresponding field of the scheduling assignment for indicating whether or not radio resource reservation is performed for the data transmissions. Consequently, the scheduling assignment indicates that as long as the data resources are reserved, the corresponding scheduling assignment resources shall also be reserved. For instance, the scheduling assignment may include a "periodicity" field, possibly indicating the periodicity of the radio resources reservation, the number of instances of the reservation etc. No radio reservation (for the data transmission as well as the SA transmission) is for instance indicated by including a value of 0 in this periodicity field.

In the above implementations of the second embodiment, the retransmissions to be performed for the scheduling assignments were not yet considered. Nevertheless, in order to increase the robustness of the scheduling assignment transmission, one or more retransmissions of the scheduling assignment should be performed by the vehicular UE over the sidelink interface. In said connection, in one exemplary implementation, a fixed number of (re)transmissions can be pre-configured. As in the prior art, the vehicular UE can transmit the retransmissions of the scheduling assignment in a fixed time relation with respect to the first transmission of the scheduling assignment. Alternatively, another association between the first transmission and the retransmissions of scheduling assignment can be agreed upon between the vehicular UE and possible receiving entities. According to still alternative solutions, the vehicular UE may also choose the radio resources for the retransmission of scheduling assignment randomly, as done for the first transmission. For instance, the radio resources available for the transmission of scheduling assignments can be further divided into resources for the first transmission and resources for the further retransmissions of the scheduling assignment.

Randomly selecting radio resources also for the retransmissions of assignments however may be problematic. In particular, scheduling assignments are transmitted using particular radio resources within a set of radio resources, and potential receiving entities detect scheduling assignments by blind decoding within the radio resource set (also called radio resource search space). In the prior art procedure retransmissions of the scheduling assignment are performed in a fixed time relation with respect to the first transmission of the scheduling assignment such that a receiving entity knows which (re)transmissions of one particular scheduling assignment belong together (e.g., for appropriately performing soft combining to decode the scheduling assignment successfully). However, by implementing random resource selection also for the retransmissions of the scheduling assignments, such a fixed time relation can no longer be guaranteed.

Consequently, it is necessary to provide a new mechanism allowing the receiving entities to associate all the transmissions and retransmissions for one particular scheduling assignment. According to one exemplary implementation of the second embodiment, a common identifier can be included in the scheduling assignment transmissions so as to associate them together. Correspondingly, the receiving device receiving the various transmissions for one particular scheduling assignment can then, based on the common identifier, associate the correct transmissions of scheduling assignment. According to one example, the common identifier may be a source identifier, identifying both the vehicular UE as being the source of the transmission and/or the current application generating the data for which scheduling assignment is transmitted. The common identifier could be made part of the scheduling assignment or could be encoded into part of the layer 1 identifier or CRC check.

Further implementations of the second embodiment improve the selection of radio resources for the retransmissions of the scheduling assignment by basing the resource selection on the results of the sensing procedure (e.g., in the same manner as for the first transmission of the scheduling assignment discussed above). As already discussed for the above random selection of the radio resources for the SA transmission, when improving selecting radio resources based on the sensing results, a fixed time relation between the first transmission and the retransmissions can no longer be guaranteed. Consequently, it is necessary to provide a new mechanism allowing the receiving entities to associate all the transmissions and retransmissions for one particular scheduling assignment. According to one exemplary implementation of the second embodiment, a common identifier as explained already the above can be included in the scheduling assignment transmissions so as to associate them together. According to one example, the common identifier may be a source identifier, identifying both the vehicular UE as being the source of the transmission and/or the current application generating the data for which scheduling assignment is transmitted. The common identifier could be made part of the scheduling assignment or could be encoded into part of the layer 1 identifier.

Hardware and Software Implementation of the Present Disclosure

Other exemplary embodiments relate to the implementation of the above described various embodiments using hardware, software, or software in cooperation with hardware. In this connection a user terminal (mobile terminal) is provided. The user terminal is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure

The invention claimed is:

1. A user equipment comprising:
   a transceiver, which, in operation, performs a resource sensing procedure regarding radio resources usable for the user equipment to transmit data via a sidelink interface at a later point in time; and
   circuitry, which, in operation, performs an autonomous radio resource allocation to select, based on a result of the resource sensing procedure during a sensing window, radio resources within a transmission window to be used for transmitting the data,
   wherein the autonomous radio resource allocation includes selecting radio resources in primary subframes of the transmission window preferably over radio resources in secondary subframes of the transmission window, and
   wherein the secondary subframes in the transmission window correspond to those subframes in the sensing window during which the user equipment did not perform the resource sensing procedure, and the primary subframes in the transmission window correspond to those subframes in the sensing window during which the user equipment did perform the resource sensing procedure.

2. The user equipment according to claim 1, wherein, in the resource sensing procedure, the transceiver performs:
   in order to determine radio resources that are reserved by other user equipments, monitoring for scheduling information transmitted by other user equipments indicating radio resources reserved by the other user equipments for a later point in time, and
   measuring a received signal energy in radio resources so as to identify radio resources that are used by other user equipments for transmission.

3. The user equipment according to claim 1, wherein the circuitry, in operation, determines the secondary subframes as being those subframes of the transmission window for which the resource sensing procedure did not acquire all possible information during the sensing window, and wherein missing information for a secondary subframe includes:
information on received signal energy in radio resources of a subframe in the sensing window in which the user equipment did not perform the resource sensing procedure.

4. The user equipment according to claim 1, wherein the autonomous radio resource allocation further includes determining one or more primary transmission radio resource candidates within the primary subframes and determining one or more secondary transmission radio resource candidates within the secondary subframes,
and in case there are more than one primary transmission radio resource candidates, the circuitry, in operation, performs candidate ranking of the primary transmission radio resource candidates, and in case there are more than one secondary transmission radio resource candidates, the circuitry, in operation, performs candidate ranking of the secondary transmission radio resource candidates, wherein the candidate ranking of the one or more primary transmission radio resource candidates is separate from the ranking of the one or more secondary transmission radio resource candidates,
wherein the candidate ranking considers a time distance of the radio resource candidate from a point in time the data became available for transmission as well as a received signal energy prediction obtained by the resource sensing procedure for the radio resources to be ranked,
wherein the received signal energy prediction for the radio resources to be ranked is based on the measurements of the received signal energy of corresponding radio resources in all subframes of the sensing window or based on the measurements of the received signal energy of corresponding radio resources in subframes of the sensing window related to the subframe for which radio resources are to be ranked, wherein the related subframes are those subframes of the sensing window which are distanced from the radio resources to be ranked by a multiple of possible transmission periodicities, and
wherein the candidate ranking first considers the time distance and then the received signal energy, or wherein the candidate ranking first considers the received signal energy and then the time distance, or wherein the candidate ranking is based on a function of the time distance and the received signal energy.

5. The user equipment according to claim 1, which, when performing a data transmission or a scheduling assignment transmission for a data transmission in a subframe, does not perform the resource sensing procedure in that subframe.

6. The user equipment according to claim 1, wherein in case no radio resources could be selected to be used for the transmission of the data, the circuitry, in operation, determines to drop the data in case a priority of the data available for transmission is below a preemption priority threshold, and in case the data is not dropped, the circuitry, in operation, performs a resource preemption procedure to select radio resources to be used for the transmission of the data from among the radio resources reserved by one or more of other user equipments, and
wherein the circuitry, when performing the resource preemption procedure, selects the radio resources to be used for the transmission of the data, based on at least one of a priority of reserved radio resources, a priority of the data to be transmitted, and received signal energy measured by the resource sensing procedure in radio resources of corresponding subframes in the sensing window, wherein the selection of radio resources in the resource preemption procedure either first considers the priority of the reserved radio resources and then the received signal energy of the reserved radio resources or first considers the received signal energy of the reserved radio resources and then the priority of the reserved radio resources or is based on a function of the priority and the received signal energy of the reserved radio resources.

7. The user equipment according to claim 1, wherein the circuitry, in operation,
determines a channel busy ratio of the sidelink interface indicating a congestion level of the sidelink interface,
performs a data dropping procedure before performing the autonomous radio resource allocation based on the determined channel busy ratio of the sidelink interface so as to determine whether data becoming available for transmission should be dropped or not, wherein the data dropping procedure includes dropping the data when a priority of the data becoming available for transmission is lower than a channel priority threshold, the channel priority threshold depending on the determined channel busy ratio of the sidelink interface and on the type of the data becoming available for transmission, wherein a safety-data-related channel priority threshold is lower than a non-safety-data-related channel priority threshold, and
in response to determining to not drop the data, performs the autonomous radio resource allocation,
wherein the user equipment is configured by a radio base station controlling the user equipment to perform or not perform the data dropping procedure, wherein the configuration of the data dropping procedure is separate for each of a plurality of resource pools usable by the user equipment to select the radio resources for transmitting data.

8. The user equipment according to claim 1,
wherein the autonomous radio resource allocation includes excluding radio resources reserved by other user equipments, and/or
wherein a radio resource candidate within a subframe includes one or more resource blocks that are contiguous in a frequency domain.

9. The user equipment according to claim 1, wherein the sensing window comprises frequency time radio resources starting at a predetermined point in time before the data becomes available for transmission and ending at the point in time the data becomes available for transmission, and
the transmission window comprises frequency time radio resources starting at a starting subframe that is immediately after the subframe the data became available for transmission and ending at a subframe that is a predetermined distance away from the starting subframe, wherein the predetermined distance depends on delay requirements of the data becoming available for transmission.

10. The user equipment according to claim 1, wherein the secondary subframes are defined by periodicities of radio resources that can be reserved by other user equipments.

11. A method performed by a user equipment, the method comprising:
performing a resource sensing procedure regarding radio resources usable for the user equipment to transmit data via a sidelink interface at a later point in time, and
performing an autonomous radio resource allocation to select, based on a result of the resource sensing procedure during a sensing window, radio resources within a transmission window to be used for transmitting the data,
wherein the autonomous radio resource allocation includes selecting radio resources in primary subframes of the transmission window preferably over radio resources in secondary subframes of the transmission window, and
wherein the secondary subframes in the transmission window correspond to those subframes in the sensing window during which the user equipment did not perform the resource sensing procedure, and the primary subframes in the transmission window correspond to those subframes in the sensing window during which the user equipment did perform the resource sensing procedure.

12. The method according to claim 11, wherein the resource sensing procedure includes:
monitoring for scheduling information transmitted by other user equipments indicating radio resources reserved by the other user equipments for a later point in time, so as to determine radio resources that are reserved by other user equipments, and
measuring a received signal energy in radio resources so as to identify radio resources that are used by other user equipments for transmission.

13. The method according to claim 11, further comprising:
determining the secondary subframes as being those subframes of the transmission window for which the resource sensing procedure did not acquire all possible information during the sensing window,
wherein missing information for a secondary subframe includes:
information on received signal energy in radio resources of a subframe in the sensing window in which the user equipment did not perform the resource sensing procedure.

14. The method according to claim 11, wherein the autonomous radio resource allocation further includes determining one or more primary transmission radio resource candidates within the primary subframes and determining one or more secondary transmission radio resource candidates within the secondary subframes,
and in case there are more than one primary transmission radio resource candidates, the method comprises performing candidate ranking of the primary transmission radio resource candidates, and in case there are more than one secondary transmission radio resource candidates, the method comprises performing candidate ranking of the secondary transmission radio resource candidates, wherein the candidate ranking of the one or more primary transmission radio resource candidates is separate from the ranking of the one or more secondary transmission radio resource candidates,
wherein the candidate ranking considers a time distance of the radio resource candidate from a point in time the data became available for transmission as well as a received signal energy prediction obtained by the resource sensing procedure for the radio resources to be ranked,
wherein the received signal energy prediction for the radio resources to be ranked is based on the measurements of the received signal energy of corresponding radio resources in all subframes of the sensing window or based on the measurements of the received signal energy of corresponding radio resources in subframes of the sensing window related to the subframe for which radio resources are to be ranked, wherein the related subframes are those subframes of the sensing window which are distanced from the radio resources to be ranked by a multiple of possible transmission periodicities, and
wherein the candidate ranking first considers the time distance and then the received signal energy, or wherein the candidate ranking first considers the received signal energy and then the time distance, or wherein the candidate ranking is based on a function of the time distance and the received signal energy.

15. The method according to claim 11, wherein in case no radio resources could be selected to be used for the transmission of the data, the method comprises determining to drop the data in case a priority of the data available for transmission is below a preemption priority threshold, and in case the data is not dropped, the method comprises performing a resource preemption procedure to select radio resources to be used for the transmission of the data from among the radio resources reserved by one or more of other user equipments, and
wherein, when performing the resource preemption procedure, the method comprises selecting the radio resources to be used for the transmission of the data, based on at least one of a priority of reserved radio resources, a priority of the data to be transmitted, and received signal energy measured by the resource sensing procedure in radio resources of corresponding subframes in the sensing window, wherein the selection of radio resources in the resource preemption procedure either first considers the priority of the reserved radio resources and then the received signal energy of the reserved radio resources or first considers the received signal energy of the reserved radio resources and then the priority of the reserved radio resources or is based on a function of the priority and the received signal energy of the reserved radio resources.

16. The method according to claim 11, further comprising:
determining a channel busy ratio of the sidelink interface indicating a congestion level of the sidelink interface, and
performing a data dropping procedure before performing the autonomous radio resource allocation based on the determined channel busy ratio of the sidelink interface so as to determine whether data becoming available for transmission should be dropped or not, wherein the data dropping procedure includes dropping the data when a priority of the data becoming available for transmission is lower than a channel priority threshold, the channel priority threshold depending on the determined channel busy ratio of the sidelink interface and on the type of the data becoming available for transmission, wherein a safety-data-related channel priority threshold is lower than a non-safety-data-related channel priority threshold, and
performing the autonomous radio resource allocation in case it is determined not to drop the data,
wherein the user equipment is configured by a radio base station controlling the user equipment to perform or not perform the data dropping procedure, wherein the configuration of the data dropping procedure is separate for each of a plurality of resource pools usable by the user equipment to select the radio resources for transmitting data.

17. The method according to claim 11, wherein the secondary subframes are defined by periodicities of radio resources that can be reserved by other user equipments.

* * * * *